US009684009B2

(12) United States Patent
Okur et al.

(10) Patent No.: US 9,684,009 B2
(45) Date of Patent: Jun. 20, 2017

(54) MEASURING LAUNCH AND MOTION PARAMETERS

(71) Applicant: Rapsodo Pte. Ltd., Singapore (SG)

(72) Inventors: Batuhan Okur, Singapore (SG); Lodiya Radhakrishnan Viyayanand, Singapore (SG); Kelvin Yeo Soon Keat, Singapore (SG); Nyan Myo Naing, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 436 days.

(21) Appl. No.: 14/045,654

(22) Filed: Oct. 3, 2013

(65) Prior Publication Data

US 2014/0028838 A1  Jan. 30, 2014

Related U.S. Application Data

(63) Continuation-in-part of application No. 13/688,974, filed on Nov. 29, 2012.
(Continued)

(51) Int. Cl.
*G01P 3/38* (2006.01)
*G01P 3/68* (2006.01)
(Continued)

(52) U.S. Cl.
CPC .................. *G01P 3/38* (2013.01); *G01P 3/68* (2013.01); *G01S 7/4808* (2013.01);
(Continued)

(58) Field of Classification Search
CPC ............... G01P 3/38; G01P 3/68; G01S 17/58
(Continued)

(56) References Cited

U.S. PATENT DOCUMENTS 5,437,457 A    8/1995  Curchod
7,223,956 B2   5/2007  Yoshida
(Continued)

FOREIGN PATENT DOCUMENTS

GB    2478059 A      8/2011
JP    H02-123927 U   10/1990
(Continued)

OTHER PUBLICATIONS

JPH11-257954 Translation.*
(Continued)

*Primary Examiner* — Jamie Atala
*Assistant Examiner* — Nguyen Truong
(74) *Attorney, Agent, or Firm* — Maschoff Brennan

(57) ABSTRACT

An example embodiment includes an apparatus for monitoring launch parameters of an object. The apparatus includes a transmitter optical subassembly (TOSA), a receiver optical subassembly (ROSA), a processing unit, and a camera. The TOSA includes at least one laser source configured to transmit a laser sheet along an expected flight path of an object. The ROSA is configured to receive light reflected from the object. The processing unit is configured to estimate a velocity of the object based at least partially on the received light. The camera is configured to capture one or more images of the object at a time in which the object passes through a field of view of the camera according to the estimated velocity.

17 Claims, 20 Drawing Sheets

Related U.S. Application Data

(60) Provisional application No. 61/882,553, filed on Sep. 25, 2013, provisional application No. 61/564,585, filed on Nov. 29, 2011.

(51) Int. Cl.
  *G01S 17/58* (2006.01)
  *G01S 17/02* (2006.01)
  *G01S 7/48* (2006.01)
  *G01S 7/481* (2006.01)

(52) U.S. Cl.
  CPC .......... *G01S 7/4815* (2013.01); *G01S 17/023* (2013.01); *G01S 17/58* (2013.01)

(58) Field of Classification Search
  USPC ........................................................ 348/139
  See application file for complete search history.

(56) References Cited

U.S. PATENT DOCUMENTS

| | | |
|---|---|---|
| 2001/0023209 A1 | 9/2001 | Yamamoto |
| 2004/0032970 A1 | 2/2004 | Kiraly |
| 2005/0064948 A1 | 3/2005 | Bissonnette |
| 2008/0204704 A1 | 8/2008 | Rankin et al. |
| 2012/0307081 A1* | 12/2012 | Dewald .................. G01J 3/10 348/207.11 |

FOREIGN PATENT DOCUMENTS

| | | |
|---|---|---|
| JP | H06-98959 A | 4/1994 |
| JP | H11-257954 A | 9/1999 |
| JP | 2005-236513 A | 9/2005 |
| JP | 2005-529339 A | 9/2005 |
| JP | 2011-156353 A | 8/2011 |
| WO | 03/104838 A1 | 12/2003 |

OTHER PUBLICATIONS

JPH2011-156353 Translation.*
International Search Report dated Jan. 27, 2015 as received in Application No. PCT/IB2014/064679.
Written Opinion of the International Searching Authority dated Jan. 27, 2015 as received in Application No. PCT/IB2014/064679.
International Search Report dated Apr. 28, 2014 as received in Application No. PCT/IB2013/002358.
Written Opinion of the International Searching Authority dated Apr. 28, 2014 as received in Application No. PCT/IB2013/002358.
Japanese Office Action dated Mar. 28, 2017 as received in Application No. 2016-516868 (English Translation).

* cited by examiner

MEASURING LAUNCH AND MOTION PARAMETERS

CROSS-REFERENCE TO RELATED APPLICATIONS

This patent application claims priority to and the benefit of U.S. Provisional Application No. 61/882,553 filed Sep. 25, 2013 and U.S. patent application Ser. No. 13/688,974 filed Nov. 29, 2012, which claims priority to and the benefit of U.S. Provisional Patent 61/564,585, filed Nov. 29, 2011, all of which are incorporated herein by reference.

FIELD

Some embodiments described herein relate to systems and methods for measuring launch parameters of flying objects.

BACKGROUND

Launch parameters may generally include kinematics parameters of a moving object measured at launch. Launch parameters generally involve some assumptions made on the environmental condition such as wind speed. Some example launch parameters may include, but are not limited to, speed, elevation angle, azimuth angle, spin rate, and spin axis. With the assumptions and launch parameters, an entire trajectory of an object can be extrapolated from launch parameters. For example, some systems configured to measure the launch parameters can provide the shape of trajectory from start till the end of the flight.

Currently, launch monitor systems may be used to measure launch parameters. Most launch monitors use either radar or high-speed cameras to capture data from which launch parameters are measured. The current launch monitors suffer from some shortcomings. For example, the launch monitor systems are complex and cost prohibitive for general consumers. Specifically, the radar-based launch monitors use multiple sample points, specially-marked objects, cannot adequately deal with indoor reflection, and are generally operated and calibrated by trained personnel. The some high-speed camera-based launch monitor suffers from similar calibration problems.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes an apparatus for monitoring launch parameters of an object. The apparatus includes a transmitter optical subassembly (TOSA), a receiver optical subassembly (ROSA), a processing unit, an illumination source, and a camera. The TOSA includes at least one laser source configured to transmit a laser sheet along an expected flight path of an object. The ROSA is configured to receive light reflected from the object. The processing unit is configured to estimate a velocity of the object based at least partially on the received light. The illumination source is configured to emit light at a time in which the object passes through a field of view of a camera according to the estimated velocity. The camera is configured to capture one or more images of the object at a time in which the object passes in front of the camera according to the estimated velocity of the object.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
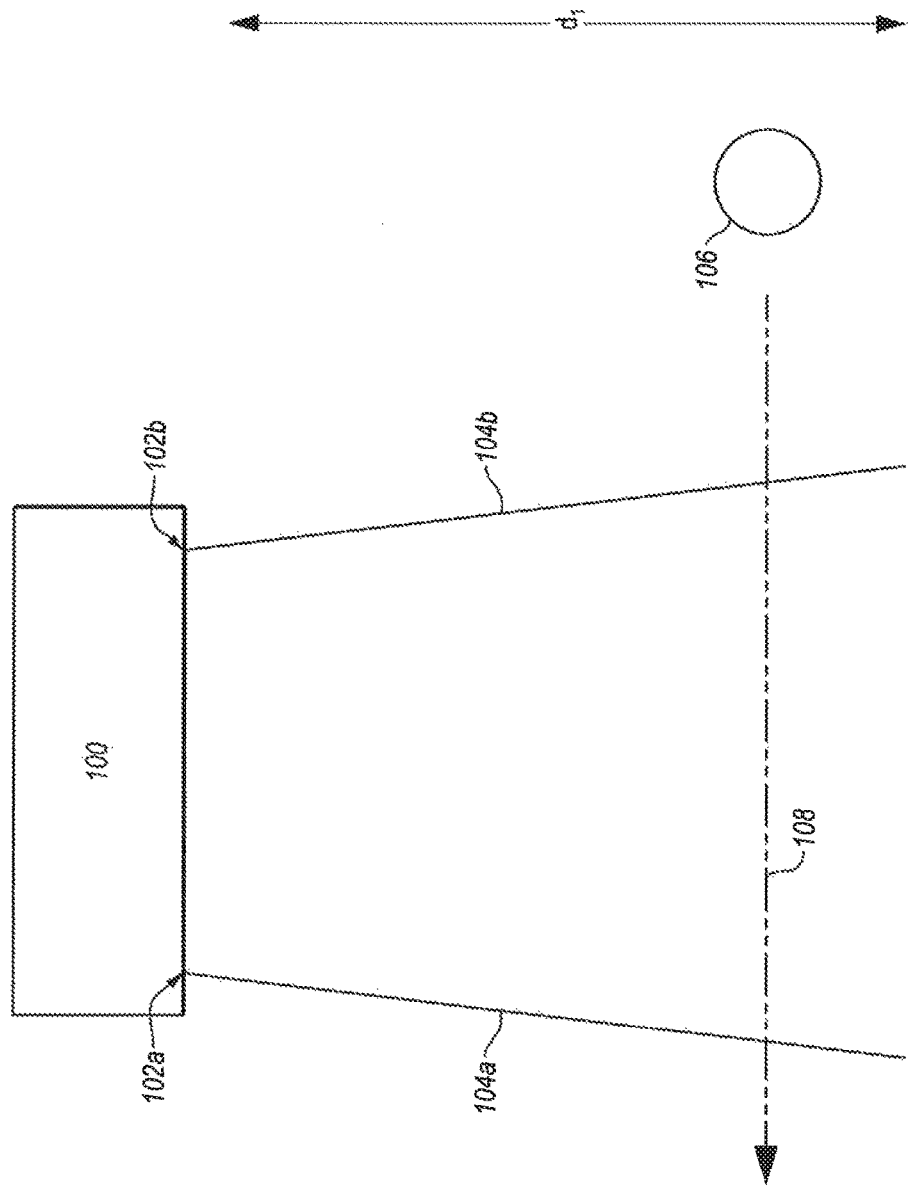
FIG. 1 is a diagram illustrating a top-down view of an apparatus for measuring launch parameters of a flying object.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Some embodiments described herein generally relate to apparatus, systems and methods for measuring launch parameters of a flying object, which may be a substantially round object, such as a golf ball, a baseball, or a cricket ball. Such parameters relate to motion of the object and may include, for example, speed, velocity, vertical angle of elevation, and azimuth angle. As used herein, the term "azimuth angle" may refer to angular separation from a point of interest to a reference point and may include a degree of deviation to the left or right on a horizontal plane.

The system may include a transmitter optical subassembly (TOSA), and a receiver optical subassembly (ROSA) for transmitting rays from a laser to the flying object and receiving the rays reflected back from the object. As a non-limiting example, the TOSA may include single or multiple pairs of laser sources, each configured to transmit laser sheets sequentially along an expected flight path of the object. As used herein, the term "sheet" refers to a broad, relatively thin continuous surface or layer. The term "sequentially" as used herein may refer to a sequence of pulses of a beam of the laser, the pulses being separated in time.

The ROSA may include one or more photodetector modules, each module including a lens system (e.g., an optical device used to converge or diverge received light), an infrared filter and a photodetector. The ROSA may be configured to receive the rays of light reflected from the object. The reflected signal from the object is received at the ROSA and the time instances of the object passing through the laser sheets are extracted and used to determine exact timing of a following photo-taking event. The developed mathematical model computes the object's primary motion data, such as velocity, using the extracted timing information. Then these measured parameters are used to calculate critical photo-taking time to enable precise image capture of the moving object so that resultant images can be used in measurement of launch parameters with reduced cost and improved efficiency. An example benefit of the advance knowledge of the timing may include eliminating a costly high-speed camera system. The mathematical model includes a non-linear filter for noise suppression, an integrator, a signal classifier, and a speed estimator.

The signals from the rays reflected back from the object received by the ROSA can be used to calculate primary launch parameters of the object. For example, data related to the launch parameters may be determined using timing information extracted from a reflected signal of the flying object. The time intervals of the object passing through the respective laser sheets may be measured and timing and signal shape information may be used to deduce the approximate speed, approximate azimuth angle of the object. The timing information may further be used to time the taking of pictures of the object and the pictures may be analyzed to determine the launch parameters with greater accuracy. The measuring apparatus, system, and method according to the present invention will be described in detail with reference to the accompanying drawings.

FIG. 1 is a diagram illustrating a top-down view of an embodiment of an apparatus 100 for measuring launch parameters of a flying object 106. While the specific examples described herein refer to the object 106 as a ball or golf ball, the system and methods may be used to determine launch parameters of any flying object. The apparatus shown in FIG. 1 includes two pairs of laser sources 102a and 102b each configured to transmit or project a sheet of laser light or laser sheet 104a and 104b sequentially along the expected flight path 108 of the object 106. For simplicity, the apparatus 100 is illustrated as including two laser sources 102a and 102b. It is to be understood that the apparatus 100 may include any number of laser pairs. Furthermore, the additional laser pairs may be added and tilted at a certain angle from the other laser pairs forming an angle between the laser sheets provided by each of the laser pairs. Such a tiled arrangement provides time interval differences when the object passes through the laser sheets 104a and 104b with the certain angle, i.e., launch angle or azimuth angle. This information could be used to position images with high precision, as will be described. The laser system allows the device to calculate speed and launch angle of the ball with reasonable accuracy. The speed and angle data can be used to calculate relative position of the object in the field of view of camera or cameras such that cameras can be tuned to take a picture of only relevant areas. The images of the ball later can be processed to calculate exact speed, launch angle, and other launch parameters of the object.

Each of the laser sheets 104a and 104b may be a substantially uniform sheet of laser light and may have a two-dimensional fan shape. One individual laser or laser source may be shining the laser sheets straight. As a non-limiting example, the laser sheets 104a and 104b may be formed using a laser diode, or other laser source, that emits the laser which is passed through an aspherical lens to create the two-dimensional fan-shaped laser sheet. For example, an infrared laser-emitting diode may be arranged into a module together with a collimated lens and a Fresnel lens configured to form the collimated light into a sheet having a thickness of between about 1 mm and about 2 mm. The laser sources 102a and 102b are horizontally arranged at certain intervals, for example, between about 60 mm apart and about 80 mm apart.

The distance $d_1$ between the flight path 108 of the object 106 and each of the laser sheets 104a and 104b may be determined. The laser sources 102a and 102b of the apparatus 100 may be used to measure a velocity (also referred to herein as "speed") of the object 106. Each laser can estimate the speed of the object 106 based on a reflection profile. One of the laser sources 102a and 102b may be used to measure launch parameters for right-handed players, and the other may be used to measure launch parameters for left-handed players. Both lasers could also be used in tandem to further specify the photo-taking event. Specifically, the velocity and direction of the object 106 may enable a camera (not shown) to properly spatially sequence images captured of the object 106.

Figure 2:
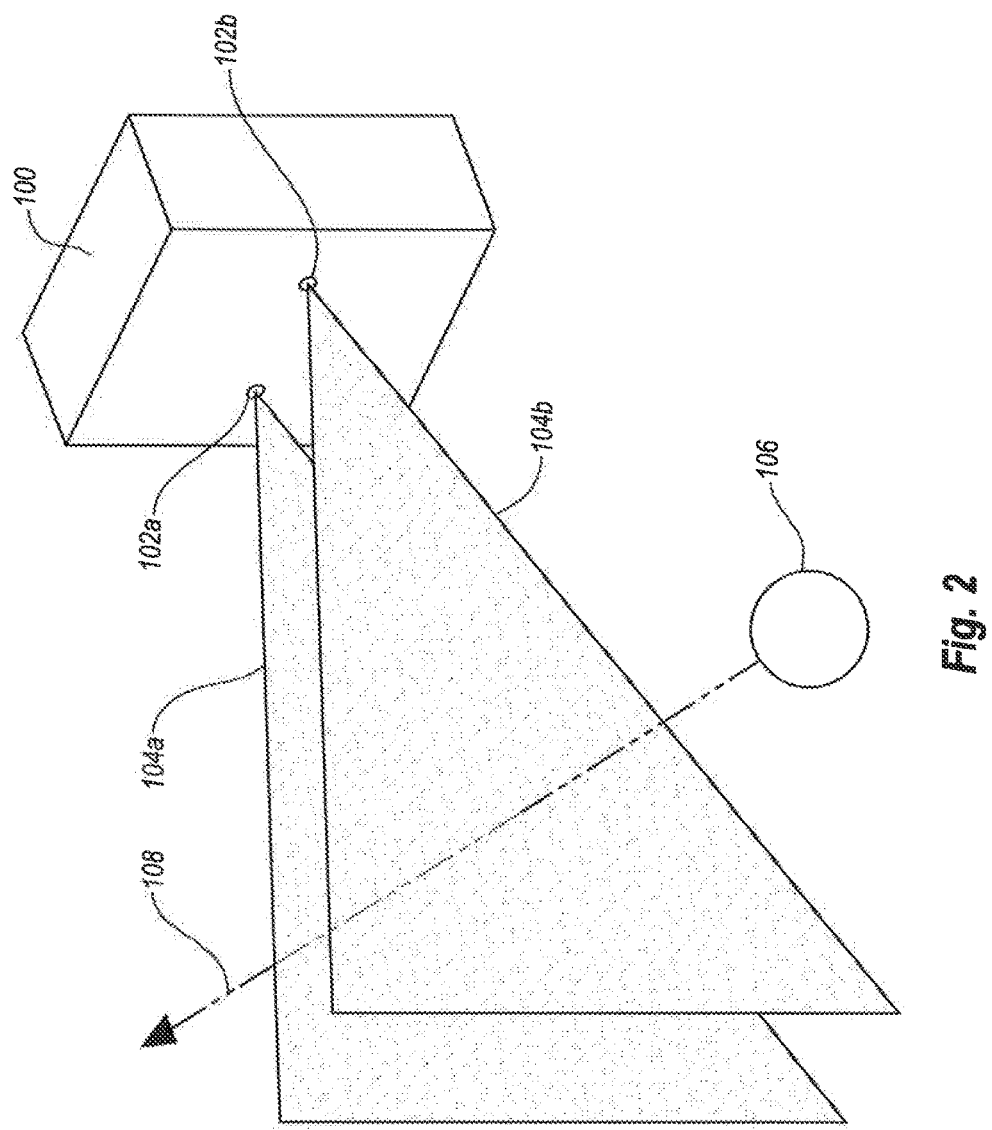
FIG. 2 is a diagram illustrating a perspective view of the apparatus of FIG. 1 including laser sheets catching the object along a flight path of the object.

Referring to FIG. 2, the laser sheets 104a and 104b are emitted along the path 108 of the object 106. When the object 106 passes through the laser sheets 104a and/or 104b, reflected light from the object 106 are received at photodetector modules (not shown). A single photodetector module may include one or more convex lenses or other optical elements that act as an amplifier by redirecting to reflected photons to the detector, an infrared filter, and photodetector for infrared light. The vision of the receiver is designed to capture the reflected light from the object in a designated area. The number of photodetector modules may be determined based on a view angle of the photodetector and the designated area to capture the reflected light.

Figure 3:
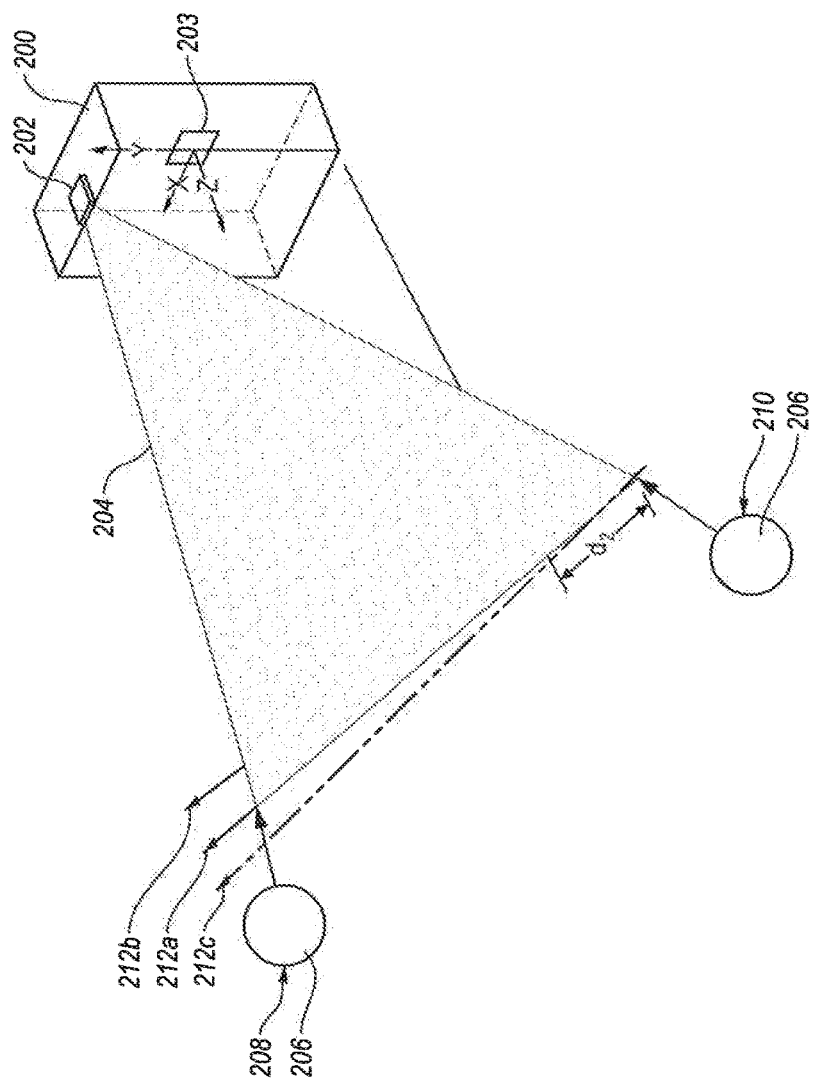
FIG. 3 shows a reference laser to indicate positioning and relative azimuth setting of the box such that user can contemplate the azimuth angle.

FIG. 3 shows an embodiment of an apparatus 200 for measuring launch parameters that includes a reference laser 202 for determining a location and target direction of the object 206 with zero azimuth angle. The apparatus 200 also includes an accelerometer 203 for correcting the launch parameters of the object 206. The corrections of the launch parameters may be based on changes to position and/or angle of the apparatus 200 that are measured by the accelerometer 203. The reference laser 202 may be configured to generate a laser sheet 204 having a two-dimensional fan-shaped beam that ends at a line positioned on an axis 212a. Alternatively, the reference laser 202 can be configured to provide two laser points instead of the line on the axis of 212a. The apparatus 200 supports the setting for a primary object motion direction. In some specific embodiments in which the apparatus 200 is configured for golf, the primary object motion direction may mean left-handed individual ("lefty") and a right-handed individual ("righty"). The left-handed ball position 208 and the right-handed position 210 are shown in FIG. 3. In embodiments in which the object is a golf ball, the distance $d_2$ between the reference laser 202 pointing to the ball positions 208 or 210 and the first laser sheet 204 of the reference laser 202 is designed to have a distance gap between the golf ball and a club head when the golf ball passes through the laser sheet 204. For example, the object 206 may be located at a corner of a triangle formed by the laser sheet 204 so that the received signals may be differentiated as a signal originating from the object 206 or from a head of a golf club. The placement ensures a reasonable gap between club head and object 206 (here, a ball) such that the laser sheet 204 can correctly estimate the speed of the ball.

Additionally or alternatively, two point lasers (not shown) can be used instead of the reference laser 202 to indicate a placement point of the object 206. A user can turn on the reference laser 202 during setup. The reference laser 202 may also turn on for a few seconds automatically after each instance in which launch parameter of an object 206 are measured. For example, in a golf context, the reference laser 202 may turn on for a few seconds after each shot for the next swing. Alternatively, the reference laser 202 may always be on as long as the apparatus 200 is ready to make a measurement and only turned off if the apparatus 200 is unable to make a measurement.

In some embodiments, the user may be prompted to place the object 206 such that he can no longer see the laser point generated by the reference laser 202. In this and other embodiments, the object 206 blocking the laser point of the laser sheet 204 on the surface may ensure proper placement of the object 206.

Some example flight paths of the object 206 are shown by directional arrows 212a (also the axis referred to above, which may indicate a straight shot), 212b and 212c in FIG. 3. For the purposes of illustration, an example of an in-to-out golf ball path 212b and an example of an out-to-in golf ball path 212c are shown in FIG. 3.

Figure 4:
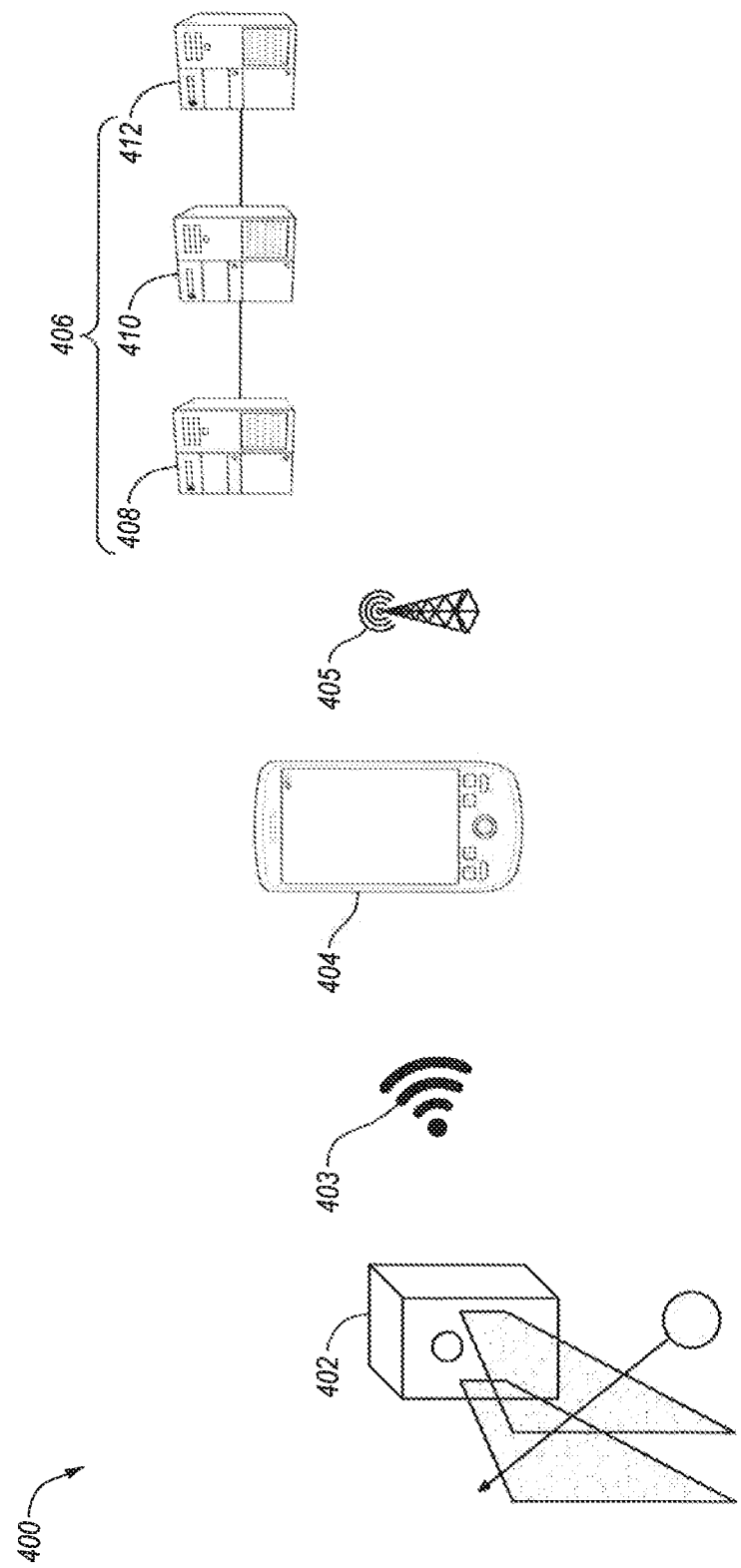
FIG. 4 illustrates an embodiment of a system including the apparatus for measuring launch parameters, a wearable system and a backend server.

As shown in FIG. 4, a system 400 for monitoring the launch parameters of an object may include an apparatus 402 for measuring the launch parameters of the ball, such as the apparatuses 100 and 200 shown in FIGS. 1, 2, and 3, a wearable or mobile device 404 and a backend server 406. The apparatus 402, the mobile device 404, and the backend server 406 may communicate with one another over one or more networks 403 and 405. The term "network" may refer to one or more communication paths between devices including, but not limited to, any telecommunications network, data network, or Voice Over IP (VOIP) network, satellite, radio, microwave, millimeter-wave, RF wireless, RF cable, optical, and networking protocols (such as IEEE 802.11g), transmission media, and communications connections or any combinations thereof. For example, the network may be a wireless network.

The user may position the apparatus 402 and turns the apparatus 402 on. The apparatus 402 executes a series of checks including the tilt of the apparatus 402 with respect to earth using accelerometers (e.g., 203 of FIG. 3). Once the apparatus 402 determines that the placement is level and that a network connection is available, the apparatus 402 may signal the user by turning on the reference laser (e.g., 104a and 104b of FIGS. 1 and 2 or 204 of FIG. 3) of the apparatus 402 and indicates a measurement may be made. In this mode, most of the components of the apparatus 402 (including the cameras) are put in standby and a valid trigger event is sought. Upon a valid trigger event (which is described below), the cameras are turned on and multiple photos are taken and subsequently images of the moving object are acquired. During this time, the reference laser is turned off until the data is processed. The images are cropped to include the moving object and transferred to the mobile device 404 via the network 403. The mobile device 404 remotely processes the images and launch parameters are obtained. As a non-limiting example, the mobile device 404 may process the images locally or using 3G/4G internet connection on a remote server.

Based on the calculated parameters, club head speed, maximum height, and landing angle, projectile trajectory and landing angle can also be estimated. After the parameter assessment stage, the measured data are transmitted to the backend server 406 via the network 405 and may be stored as the user's record. The backend server 406 may include a web application 408, a wireless communication foundation (WCF) service 410, and a database 412. The user may access the stored records, may reload the stored records, or can perform statistical analysis to observe the user's improvement using the mobile device 404. The system 400 may also provide immediate voice feedback to the user. The system 400 will generate a voice or other alert, for the speed of the ball as an example, through the wearable gadgets, i.e., earpiece, mobile phone, etc., with the user.

Figure 5:
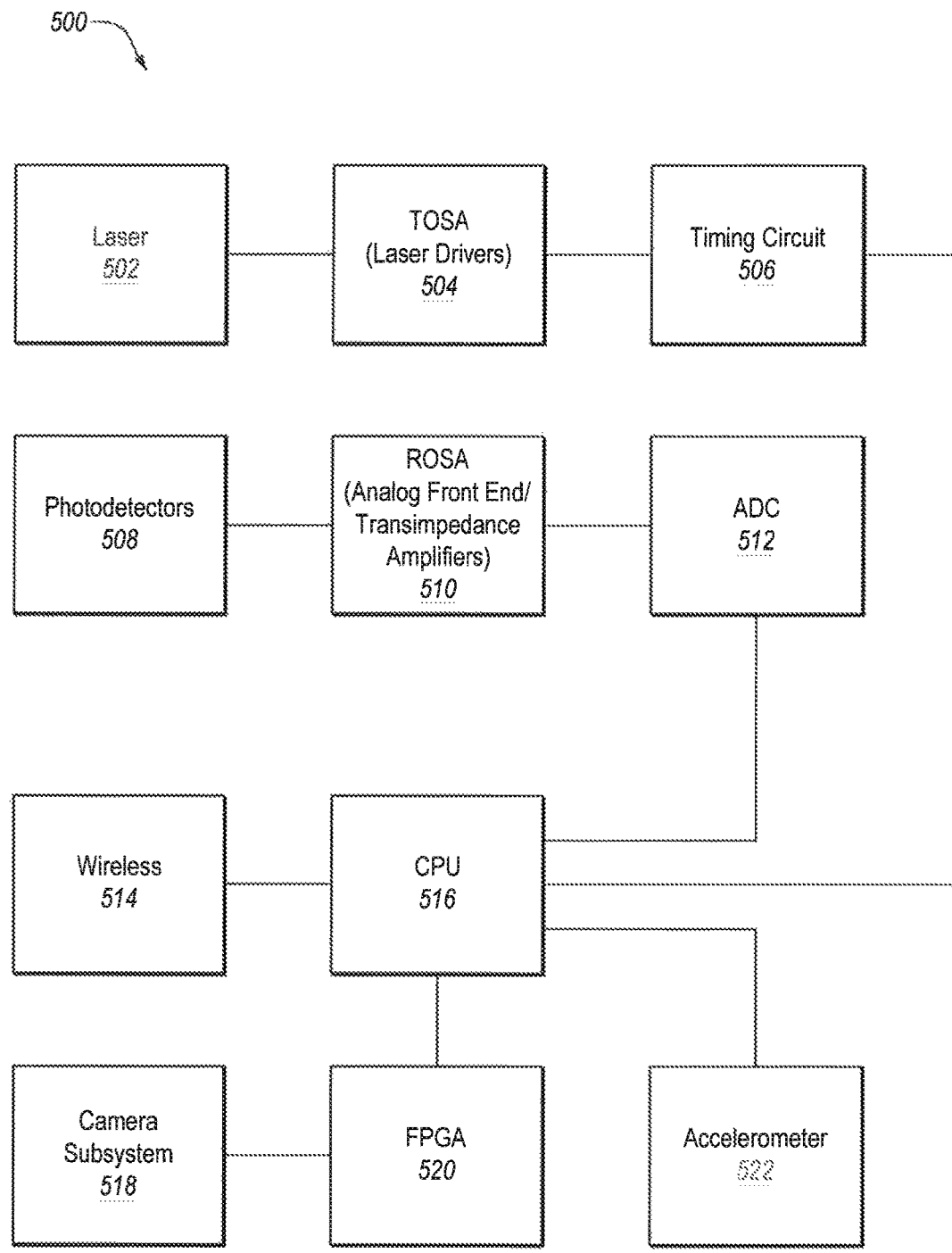
FIG. 5 is a simplified block diagram illustrating an embodiment of the architecture of the apparatus.

FIG. 5 is a simplified block diagram illustrating the architecture of an apparatus 500 for measuring launch parameters. The apparatus 500 may include lasers 502, a TOSA 504, a timing circuit 506, one or more photodetectors 508, a ROSA 510, an analog-to-digital converter (ADC) 512, a wireless transmitter/receiver (in FIG. 5 "wireless") 514, a central processing unit (CPU) 516, a camera subsystem 518, a field-programmable gate array (FPGA) 520, and an accelerometer 522. The FPGA 520 includes programmable logic that can be configured to control the camera subsystem 518.

A flying object first hits the laser sheet or sheets provided by the TOSA 504. This event is captured by photodetectors 508 and ROSA 510 subsystem. Reflected data passes through the timing circuit 506 and is sampled by the internal ADC 512 of the CPU 516 in real time. The CPU 516 may process the data as discussed below with reference to FIG. 7. Once the CPU 516 detects that the object is a valid object, such as golf ball, it instructs the FPGA 520 to start taking photos of the object, The FPGA 520 also provides the appropriate timing and appropriate location of the object. The FPGA 520 uses this data to take multiple pictures of the object and stores the data in a local memory. Once the photo-taking event is completed, the FPGA 520 or CPU 516 crops the photographs to a smaller size. After this cropping operation is completed, the photos are transmitted by the CPU 516 to the user's wireless subsystem 514, to the mobile device, or other processing device.

Figure 6A:
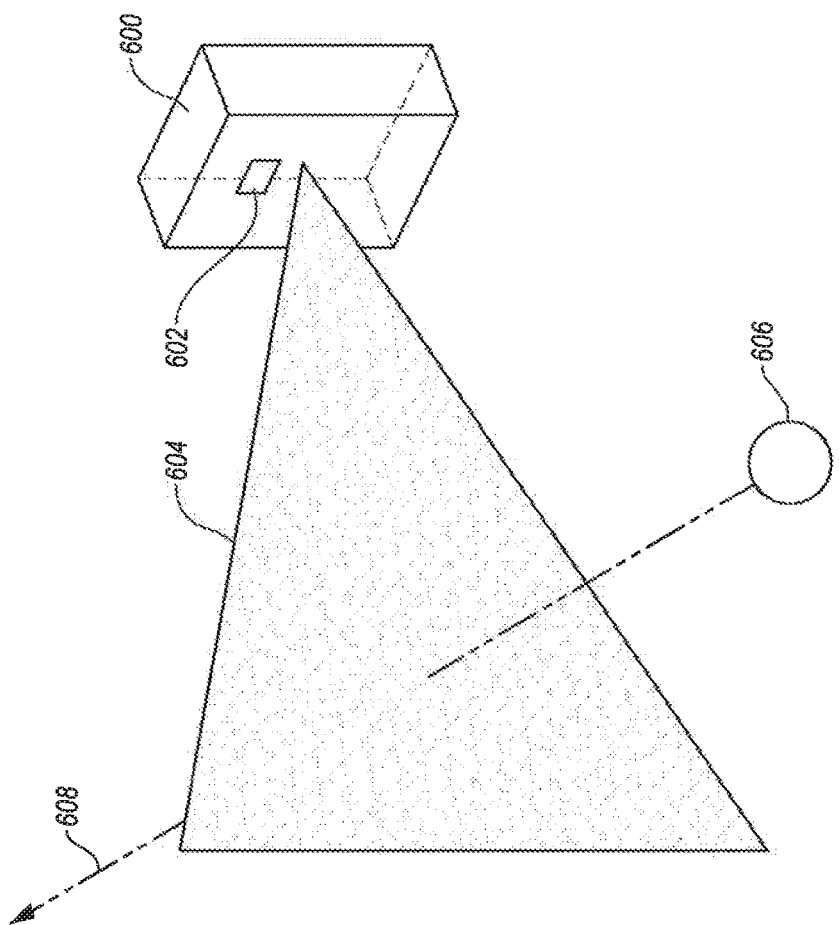
FIGS. 6A through 6C illustrate an embodiment of an apparatus including a single laser sheet and single photodetector system for the golf ball's speed measurement.
Figure 6C:
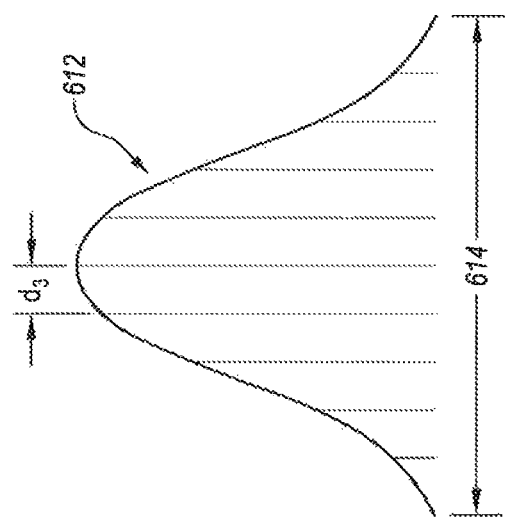
Figure 6B:
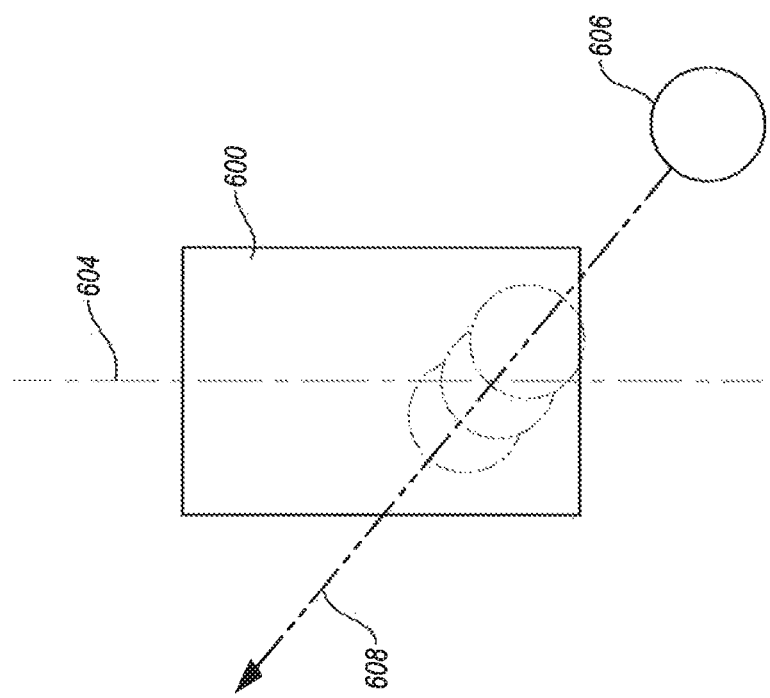

FIGS. 6A and 6B illustrate another embodiment of an apparatus for measuring launch parameters of an object 606. FIG. 6A is a perspective view of the apparatus 600, which generates a single laser sheet 604 and includes a single photodetector 602 for measurement of the speed of the object 606. The object 606 may pass through the laser sheet 604 along a path 608. As shown in FIG. 6B, which is a front view of the apparatus 600, the object 606 may move along the path 608 through the laser sheet 604.

With reference to FIGS. 6A-6C, the laser sheet 604 may be emitted sequentially in a series of pulses separated by a time, or pulse width $d_3$ (FIG. 6C only). FIG. 6C illustrates plot of the reflected signal 612 from the object 606 over time 614 as the object 606 passes through the laser sheet 604. As is illustrated by the plot, the reflected signal 612 may have an amplitude change as the object 606 travels through the laser sheet 604. For example, when only a portion of the object 606 is interfering with the laser sheet 604 and thus reflecting signals, there may be relatively low reflected signal (e.g., at either end of the plot in FIG. 6C) and when a larger portion (e.g., the entire cross-sectional area of the object 606) is interfering with the laser sheet 604, there may be a higher reflected signal (e.g., in the center of the plot in FIG. 6C).

Figure 7:
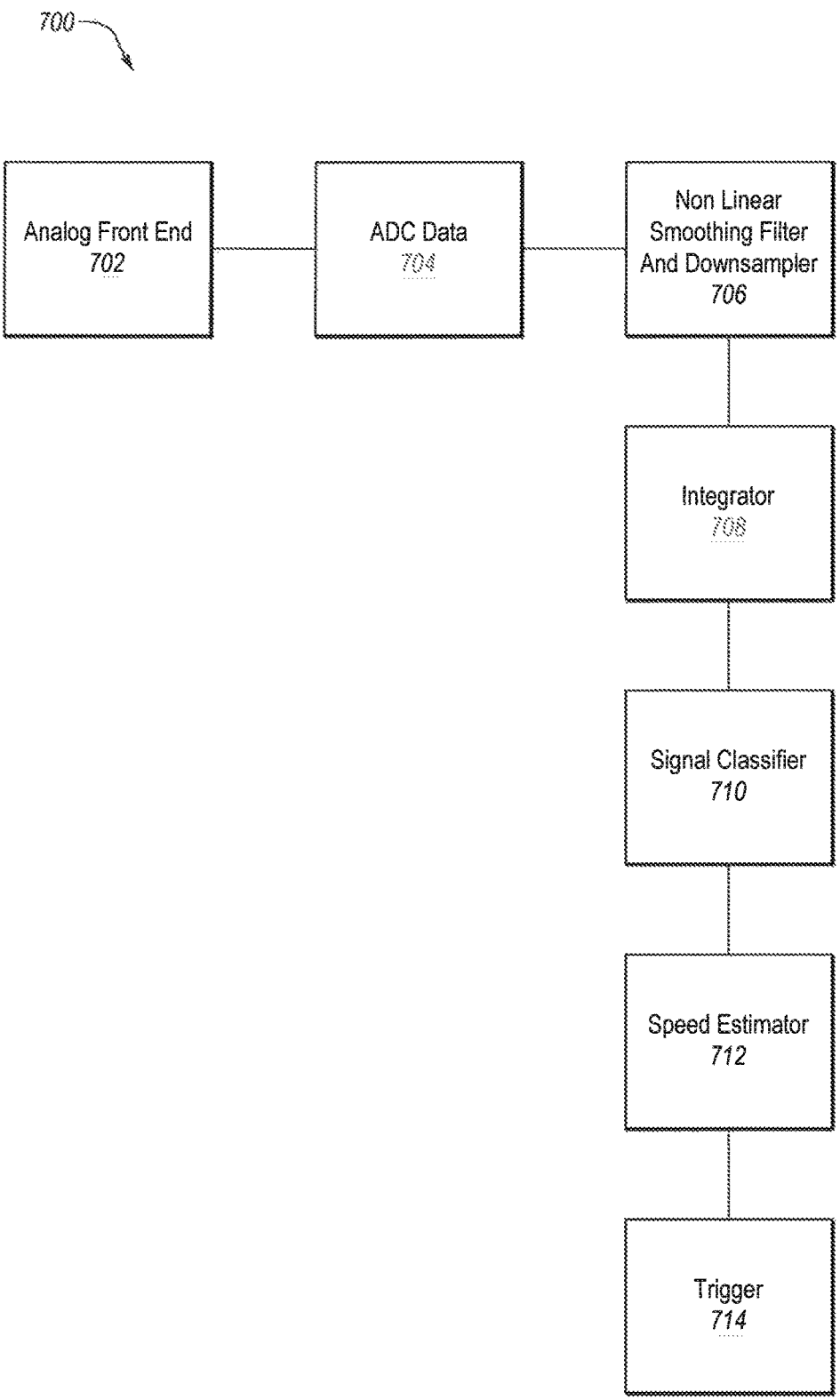
FIG. 7 is a block diagram illustrating a method of measuring at least one launch parameter.

FIG. 7 is a block diagram illustrating an example method 700 of measuring at least one launch parameter in an apparatus such as the apparatuses described with reference to one or more of FIGS. 1-6 above. An incoming signal may be captured by the analog front end 702. The signal may be digitalized by an ADC 704. The signal is passed through filtering stages to reduce noise. The cleaned signal is fed to a noise immune peak state detector, such as a non-linear smoothing filter and downsampler 706. The signal may then be passed through an integrator 708 to determine a peak state detector. After the integrator 708 determines that the signal contains a valid peak, the signal is passed through a signal classifier 710 where a shape of the signal is analyzed. Based on experimentation, the round object presents a symmetrical signal shape with a clean peak. After the signal classifier 710 determines the signal matches the ball shape, slopes of the rise and fall are normalized and later analyzed using linear regression or similar mathematical regression methods. The normalized slope rise and fall contains speed information of the ball regardless of the amplitude of the signal.

The speed estimator 712 may be configured to correlate the slopes to a speed. For example, the slopes may be matched to a lookup table to determine the speed. This method enables detection of the speed of an incoming round object, such as a ball, with good precision regardless of the markings on the ball, cleanliness (e.g., whiteness) of the ball, and relative distance of the ball to the detector which impacts the amplitude of the signal to a great degree.

Figure 8:
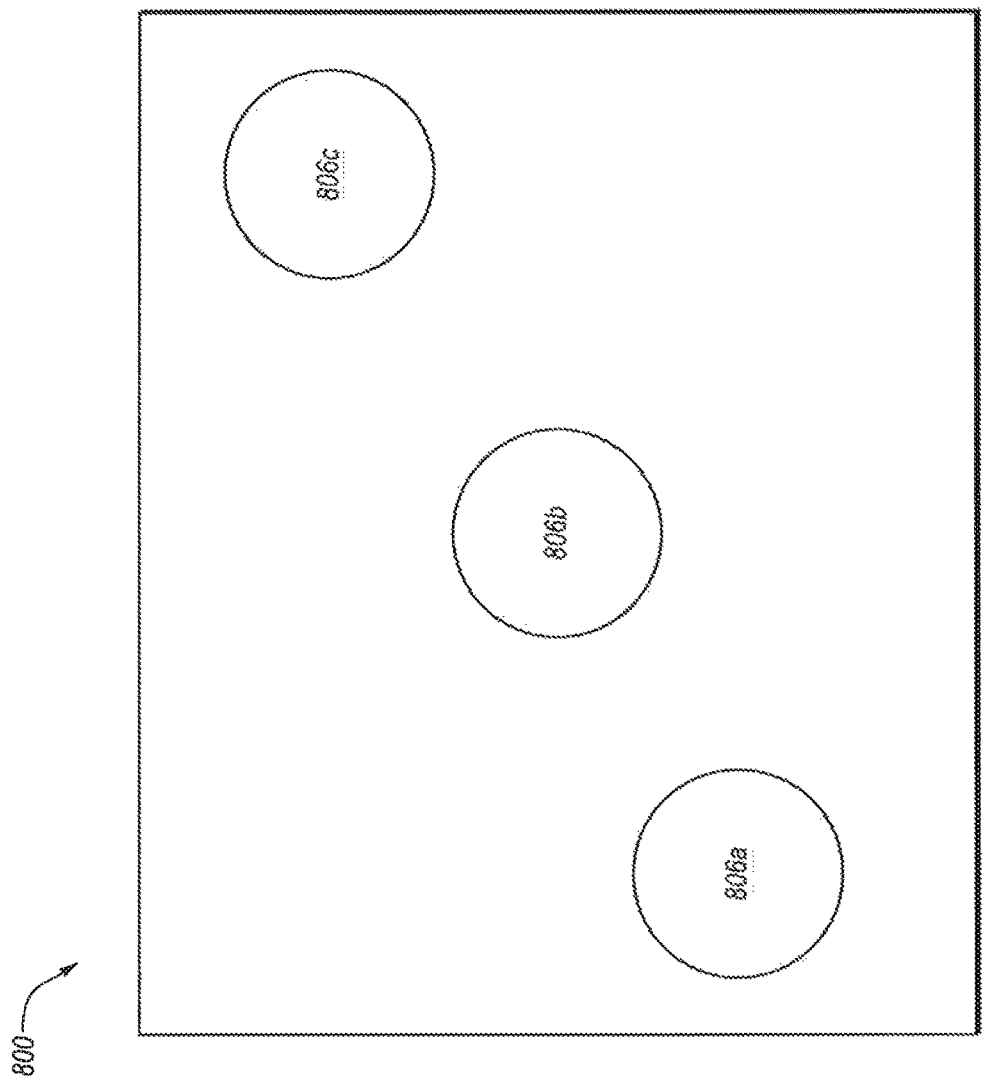
FIG. 8 is a diagram illustrating an embodiment of spatial distribution of the object in a uniform manner in a field of view of a camera.

The speed information gained in the speed estimation step 712 is used to time a photo-taking event as discussed with reference to FIG. 8. Thus, the speed information may be a trigger 714 for a photo-taking event. Using the knowledge of the speed information, the photo-taking event can be timed such that images 806A, 806B, and 806C of an object are spatially distributed in a uniform manner in the field of view (FOV) 800 of a camera included in or remotely connected to an apparatus for measuring launch parameters. An example of properly spaced images is shown in FIG. 8.

A benefit of using the lasers as a trigger for a camera may include allowing an effective use of windowing feature of cameras. Usually cameras can be adjusted to take a picture only of a limited area of their FOV, which is usually referred to as windowing. Advanced knowledge of speed, as provided by the laser sheets of the apparatus, may enable use of lower-cost cameras that does not have high frame rates but still can be used for this type of fast events due to the use of windowing capability more effectively.

The speed of the club head can be estimated using the principle of conservation of the momentum or the energy, as described in Bailey, Randolph. "Physics of the Drive in Golf." 211 Web Projects Fall 2002. Nov. 25, 2002. University of Alaska Fairbanks. Nov. 21, 2011, which is incorporated herein in its entirety.

In some embodiments, one or more of the apparatuses (e.g., 600, 402, 200, or 100) and/or one or more components included therein may be included in a system (e.g., 400 of FIG. 4) with cameras. Thus, a system architecture may include the detection system, wearable computing system, and the backend server (FIG. 4). Transmitter optical subassembly (TOSA), receiver optical subassembly (ROSA), camera subsystem, and primary processing unit may be subcomponents of the detection system.

Figure 9:
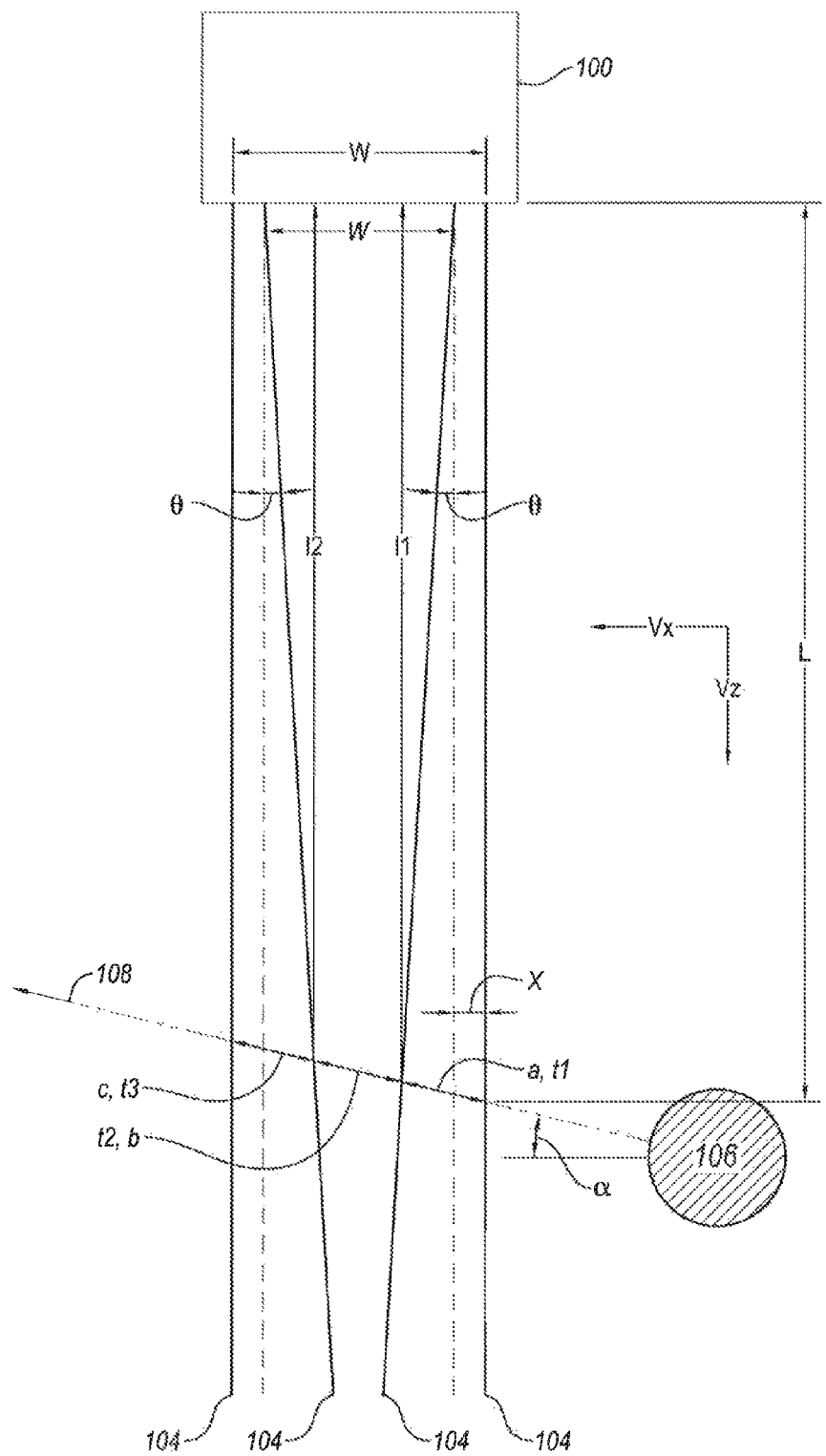
FIG. 9 is a diagram illustrating a top-down view of the apparatus of FIG. 1 measuring launch parameters of a flying object.
Figure 10:
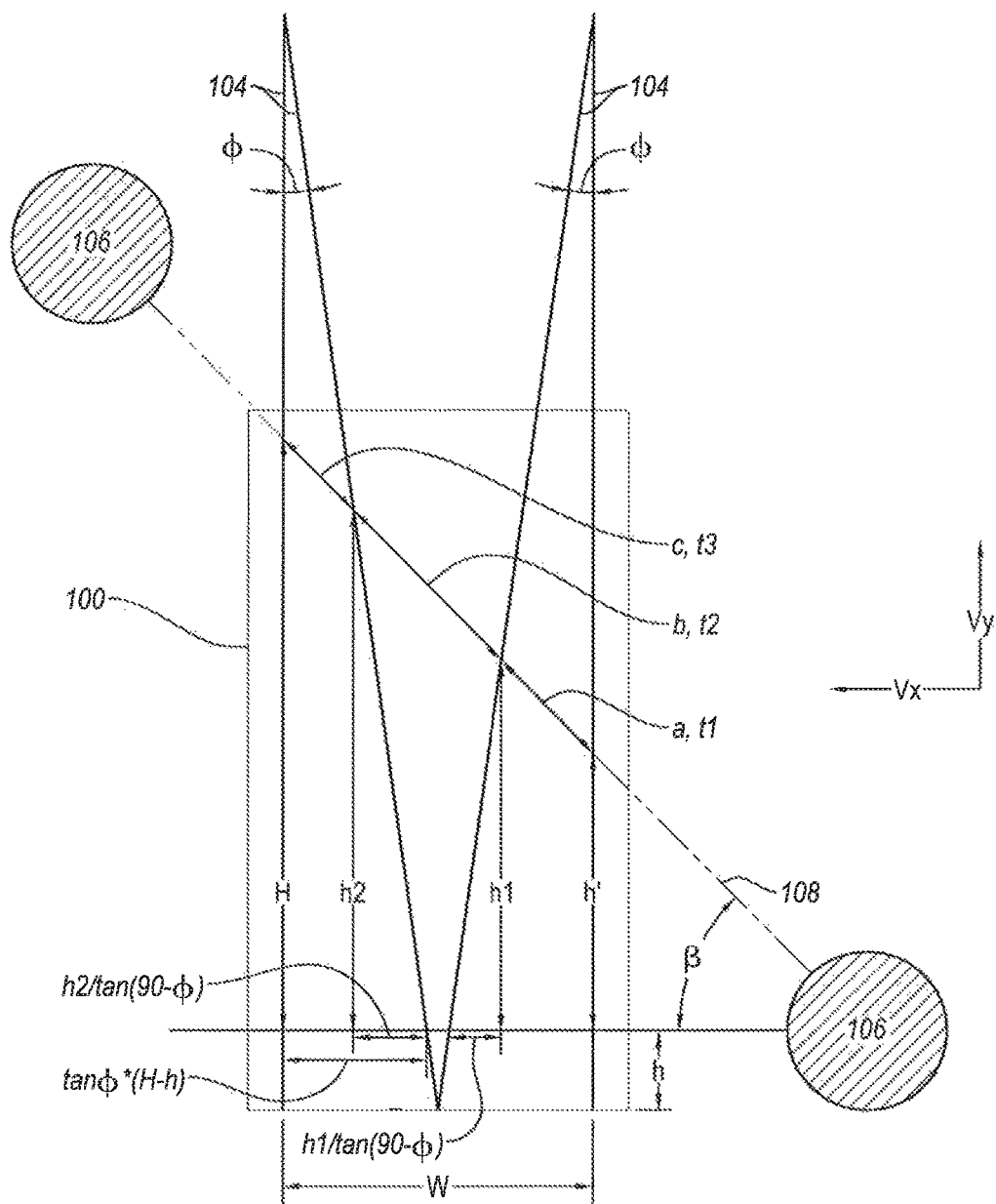
FIG. 10 is a diagram illustrating a front view of the apparatus of FIG. 1 measuring launch parameters of a flying object.

FIGS. 9 and 10 are diagrams illustrating a top-down view and a front view of the apparatus 100 of FIG. 1 measuring launch parameters of a flying object 106. With reference to FIGS. 9 and 10, example launch parameter calculations are presented. The following examples serve to illustrate embodiments in more detail. The examples are not to be construed as being exhaustive or exclusive.

Referring to FIG. 9, to estimate the velocity and the azimuth, the following equations may be used:

$$x = \frac{W-w}{2}$$

$$\frac{a}{b} = \frac{t_1}{t_2} = k_1;$$

$$\frac{a}{c} = \frac{t_1}{t_3} = k_2;$$

$$\frac{a}{a+b+c} = \frac{k_1 k_2}{k_1 k_2 + k_2 + k_1}$$

$$\cos\alpha = \frac{l_1^* \tan\theta + x}{a} = \frac{l_2^* \tan\theta + x}{c} = \frac{W}{a+b+c}$$

$$\frac{a}{c} = \frac{l_1^* \tan\theta + x}{l_2^* \tan\theta + x} = k_2$$

$$l_2 = \frac{\left[\frac{(l_1^* \tan\theta + x) - x}{k_2}\right]}{\tan\theta}$$

$$\frac{a}{a+b+c} = \frac{l_1^* \tan\theta + x}{W} = \frac{k_1 k_2}{k_1 k_2 + k_1 + k_2}$$

$$l_1 = \frac{\left[\left(\frac{k_1 k_2}{k_1 k_2 + k_1 + k_2} * W\right) - x\right]}{\tan\theta}$$

$$V_z = \frac{l_1 - l_2}{t_2}$$

$$V_x = \frac{W}{t_1 + t_2 + t_3}$$

$$\alpha = \tan^{-1}\left(\frac{l_1 - l_2}{w - \tan\theta(l_1 + l_2)}\right)$$

In the example equations and with reference to FIG. 9, the variable θ represents the angles of tilted laser sheets 104 as shown. The variable α represents the azimuth angle. The variable W represents the distance between the outer pair of laser sheets 104 as shown. The variable w represents the distance between the inner pair of lasers. The variable $L_1$ represents the distance from the apparatus 100 to the point where the object 106 passes through one of the laser sheets 104 as shown. The variable $L_2$ represents the distance from the apparatus 100 to the point where the object 106 passes through another of the laser sheets 104 as shown. The variable $t_1$ represents the time taken for the object to travel the distance, a, between the two of the laser sheets 104 as shown. The variable $t_2$ represents the time taken for the object to travel the distance, b, between the two of the laser sheets 104 as shown. The variable $t_3$ represents the time taken for the object to travel the distance, c, between the two of the laser sheets 104 as shown. The variables $k_1$ and $k_2$ represent intermediate values.

Referring to FIG. 10, to estimate the velocity and the launch angle, the following equations may be used:

$$\frac{a}{b} = \frac{t_1}{t_2} = k_1;$$

$$\frac{a}{c} = \frac{t_1}{t_3} = k_2;$$

$$\frac{a}{a+b+c} = \frac{t_1}{t_1+t_2+t_3} = \frac{k_1 k_2}{k_1+k_2+k_1 k_2}$$

$$\cos\beta = \frac{\tan\phi^*(H-h) - \tan\phi^* h_1}{a} = \frac{\tan\phi^*(H-h) - \tan\phi^* h_2}{c} = \frac{W}{a+b+c}$$

$$\frac{a}{c} = \frac{\tan\phi^*(H-h) - \tan\phi^* h_1}{\tan\phi^*(H-h) - \tan\phi^* h_2}$$

$$\frac{a}{c} = \frac{(H-h) - h_1}{(H-h) - h_2}$$

$$\frac{(H-h) - h_1}{(H-h) - h_2} = k_2$$

$$\frac{a}{a+b+c} = \frac{\tan\phi^*(H-h) - \tan\phi^* h_1}{W} = \frac{k_1 k_2}{1 + k_2 + k_1 k_2}$$

$$h_1 = \frac{\left[\tan\phi^*(H-h) - \left\{\left(\frac{k_1 k_2}{1 + k_2 + k_1 k_2}\right) * W\right\}\right]}{\tan\phi}.$$

$$h_2 = \frac{(H-h) - h_1}{k_2} - (H-h)$$

$$V_y = \frac{h_2 - h_1}{t_2}$$

$$V_x = \frac{W}{t_1 + t_2 + t_3}$$

$$\beta = \tan^{-1}\left[\frac{(h_2 - h_1)}{W - \{\tan\phi^*(H-h) - \tan\phi^* h_2\} - \{\tan\phi^*(H-h) - \tan\phi^* h_1\}}\right]$$

In the example equations and with reference to FIG. 10, the variable Φ represents the angle between two of the laser sheets 104. The variable β represents launch angle. The variable W represents the distance between the outer pair of laser sheets 104. The variable h represents the height of the center of the object 106 from the ground. The variable $h^1$ represents the distance from the center of the object 106 to the point the object 106 passes through one of the laser sheets 104 as shown. The variable $h_1$ represents the distance from the center of the object 106 to the point the object 106 passes through the laser sheets 104 as shown. The variable $h_2$ represents the distance from the center of the object 106 to the point the object 106 passes through the laser sheets 104 as shown. The variable H represents the height of the laser sheets 104 as shown. The variable $t_1$ represents the time taken for the object 106 to travel the distance, a, between two of the laser sheets 104 as shown. The variable $t_2$ represents the time taken for the object to travel the distance, b, between two of the laser sheets 104 as shown. The variable $t_3$ represents the time taken for the object 106 to travel the distance, c, between two of the laser sheets 104 as shown. The variables $k_1$ and $k_2$ represent intermediate values.

Figure 11A:
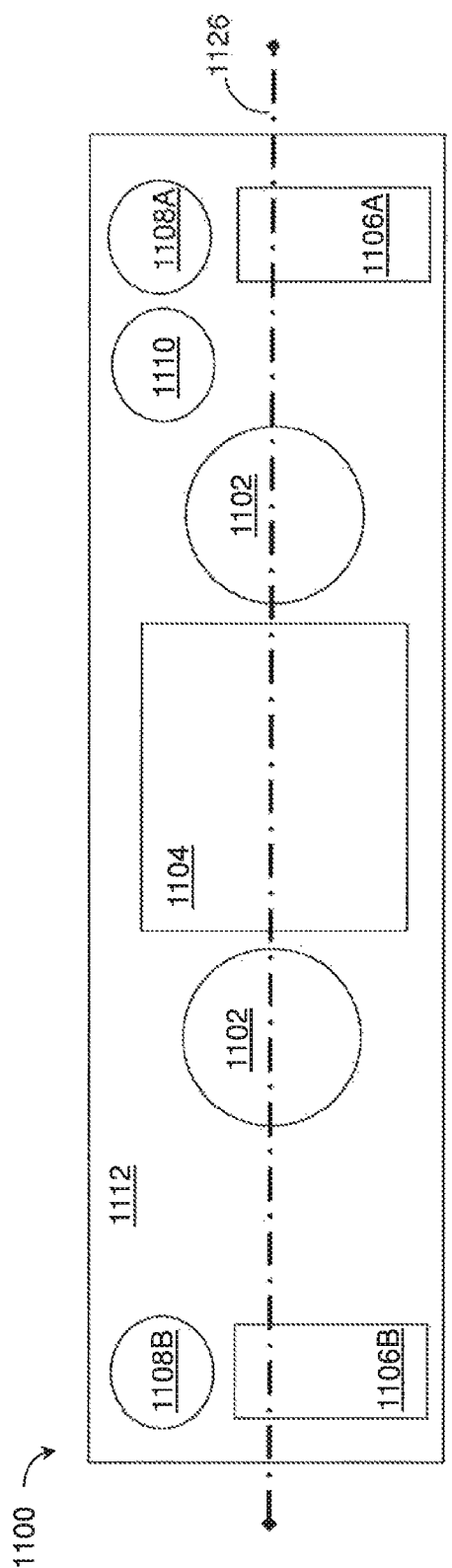
FIGS. 11A-11C are block diagrams of an example embodiment of the apparatus of FIG. 1 having a multi-positional configuration (multi-positional apparatus)
Figure 11B:
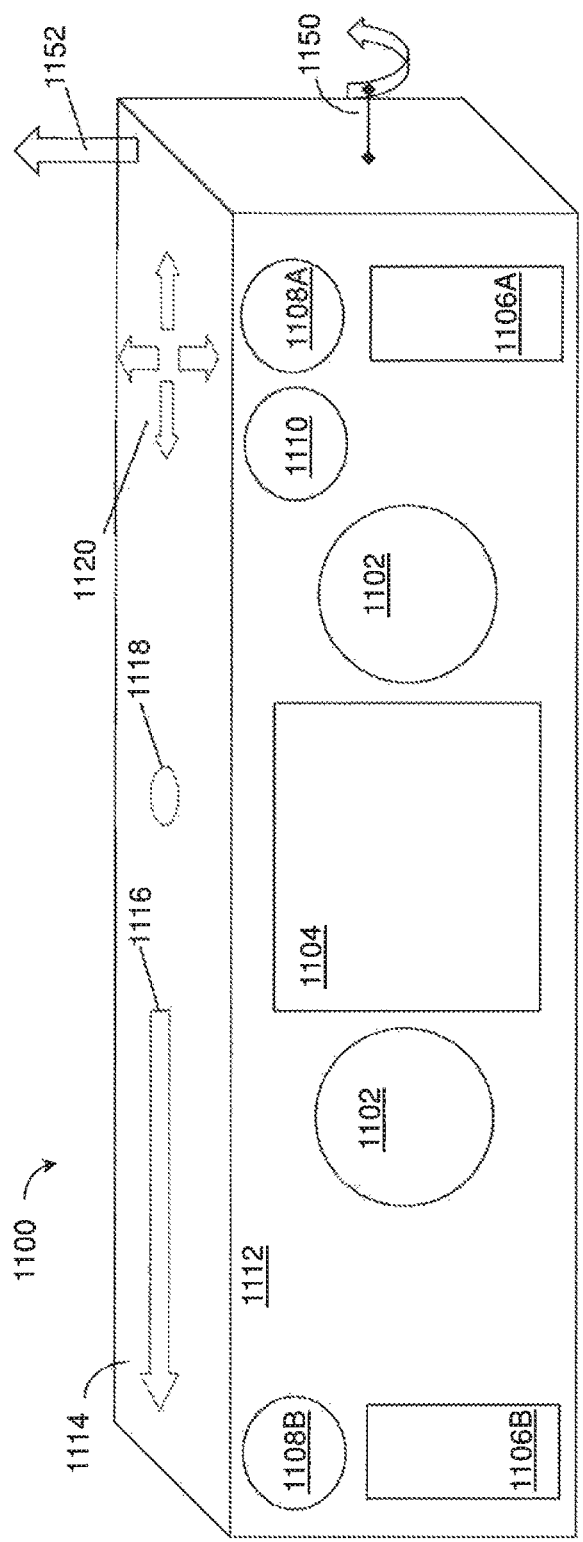
Figure 11C:
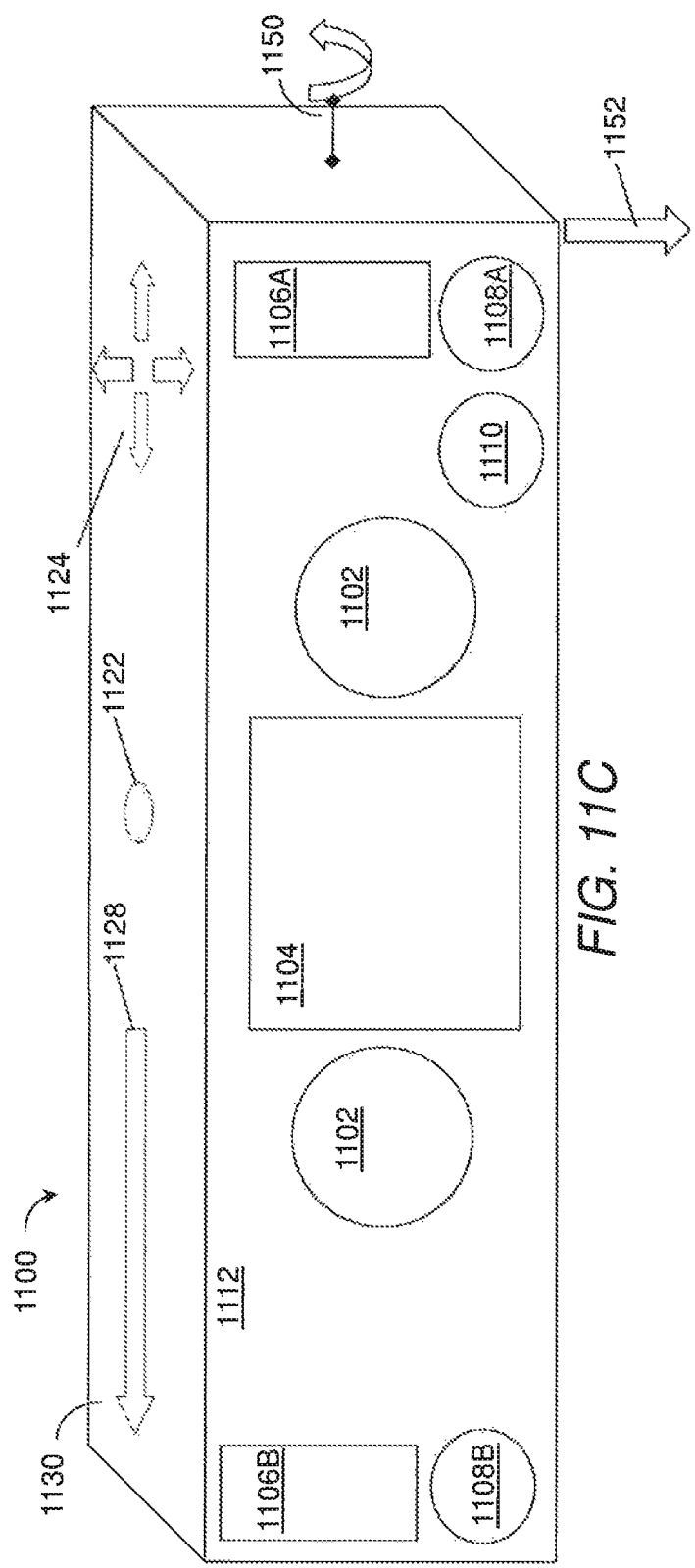

FIGS. 11A-11C are block diagrams of an example embodiment of the apparatus of FIG. 1 having a multi-positional configuration (hereinafter, a "multi-positional apparatus") 1100. FIG. 11A depicts a side view of the multi-positional apparatus 1100. FIG. 11B depicts a first perspective view of the multi-positional apparatus 1100. FIG. 11C depicts a second perspective view of the multi-positional apparatus 1100. Generally, the multi-positional apparatus 1100 may differ from the apparatus 100 of FIG. 1 in that the multi-positional apparatus 1100 may be configured around a center line 1126. Thus, with reference to FIGS. 11B and 11C, the multi-positional apparatus 1100 may be rotated 180° about an axis 1150. When the multi-positional apparatus 1100 is rotated about the axis 1150, a directional arrow 1152 point in a first direction in FIG. 11B and in a second direction in FIG. 11C. Accordingly, the multi-positional apparatus 1100 may be configured to measure launch parameters of an object from two positions.

Referring to FIG. 11A, the multi-positional apparatus 1100 may include an optical component side 1112. Included on the optical component side 1112 may be one or more cameras 1102, a flash array 1104, a first TOSA 1108A and a first ROSA 1106A. In at least some embodiments, the multi-positional apparatus 1100 only includes the first ROSA 1106A and the first TOSA 1108A.

Figure 12A:
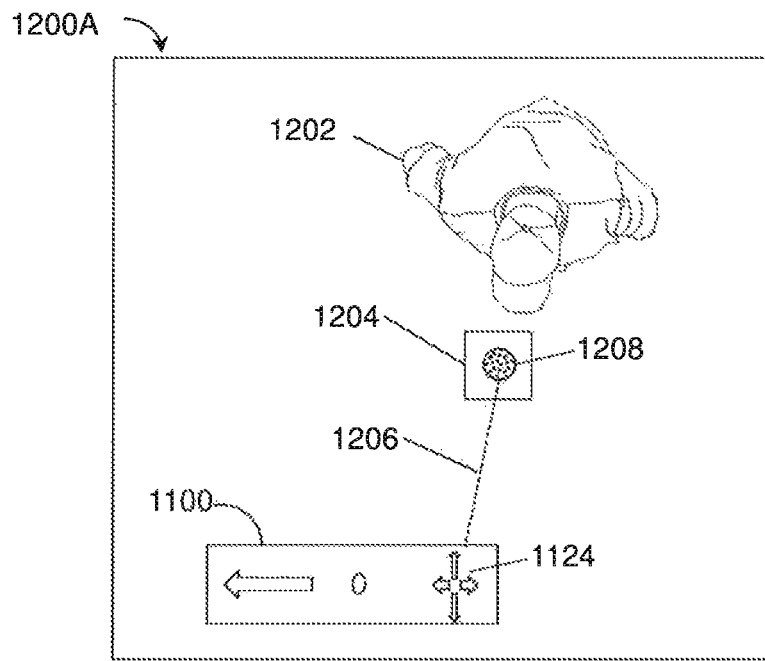
FIGS. 12A and 12B are block diagrams of the multi-positional apparatus implemented in an example operating environment.
Figure 12B:
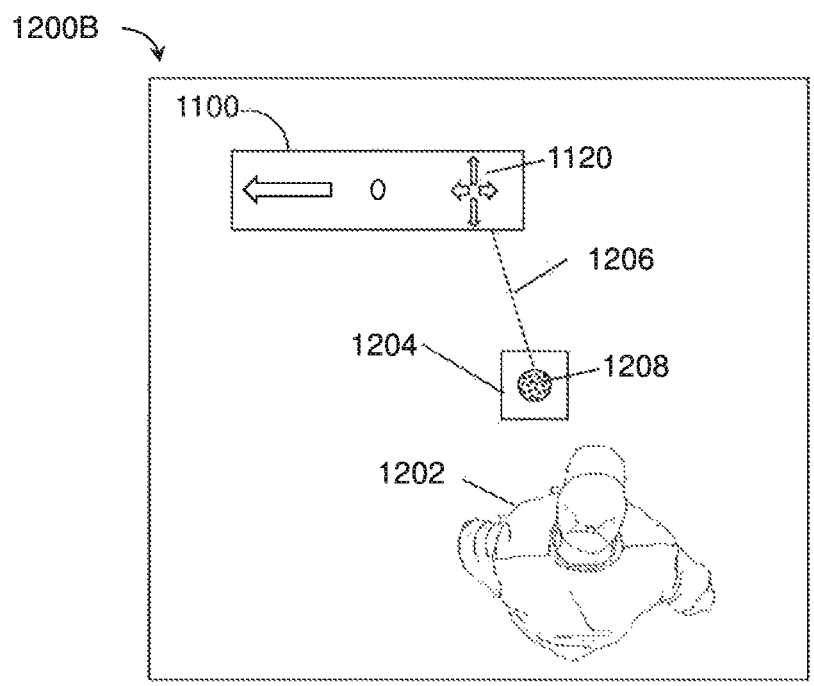

The multi-positional apparatus 1100 may be constructed according to a symmetrical center line 1126. Constructing the multi-positional apparatus 1100 according to the center line 1126 may allow the first TOSA 1108A and the first ROSA 1106A to be used when the multi-positional apparatus 1100 is re-positioned. For example, in a golf context, launch parameters of both left-handed and right-handed players may be measured by the first TOSA 1108A and the first ROSA 1106A. To change from a right-handed player to a left-handed player, the multi-positional apparatus 1100 may be rotated 180 degrees and placed upside down as shown in FIGS. 12A and 12B.

By rotating the multi-positional apparatus 1100 by 180°, the first TOSA 1108A and the first ROSA 1106A may be repositioned for the lefty player. Some advantages of the multi-positional apparatus 1100 may include a reduction of components included in the multi-positional apparatus 1100, which may reduce the costs and/or size of the multi-positional apparatus 1100. An additional advantage of the multi-positional apparatus 1100 may include the multi-positional apparatus 1100 being able to sense in which position the multi-positional apparatus 1100 is being operated. Sensing the position may reduce actions of a user to reconfigure the multi-positional apparatus 1100 prior to use.

In some embodiments, the multi-positional apparatus 1100 may include a second TOSA 1108B and a second ROSA 1106B. In these and other embodiments, the first TOSA 1108A and the first ROSA 1106A may be positioned at a first end and the second TOSA 1108B and the second ROSA 1106B may be positioned at an opposite end of the optical component side 1112. The second TOSA 1108B and the second ROSA 1106B may be used to validate a trigger event. For example, when measuring a slow-moving object, the first TOSA 1108A and the first ROSA 1106A may trigger the cameras 1102 (also referred to as a TOSA/ROSA triggering pair) and images may be captured. If the second TOSA 1108B and the second ROSA 1106B (also referred to as a TOSA/ROSA verification pair) cannot verify the presence of the object, then the data may be discarded. If the second TOSA 1108B and the second ROSA 1106B can verify the presence of the object, data including the images or information derived therefrom may be further processed and/or communicated to a mobile device for processing. When the multi-positional apparatus 1100 is positioned in the 180° position, the second TOSA 1108B and the second ROSA 1106B may be the trigger and the first TOSA 1108A and the first ROSA 1106A may verify the presence of the object.

This approach, including a triggering TOSA/ROSA pair and a verification TOSA/ROSA pair, may enable measurement of slow-moving objects. Without a configuration including the triggering TOSA/ROSA pair and the verification TOSA/ROSA pair, it may be difficult to differentiate the object from background motion since the same background motion will not present itself on the second TOSA/ROSA pair. For example, background motion of shoes or legs of the person or others may be observed by the triggering TOSA/ROSA pair but not by the verification TOSA/ROSA pair. One or more of the trigger detection mechanisms may be similar to those described above with reference to FIGS. 5 and 7 above.

The multi-positional apparatus 1100 described with reference to FIGS. 11A-11C includes two cameras. However, inclusion of two cameras is not meant to be limiting. Some alternative embodiments may include a single or multiple cameras for image capturing.

In addition to the cameras 1102, the multi-positional apparatus 1100 may include an illumination source 1104. The illumination source 1104 may be configured to illuminate the object while the images of the object are captured. In some embodiments, the illumination source 1104 may include an infrared (IR) light array, one or more light-emitting diodes (LED), or any other suitable light source. The illumination source 1104 may be positioned between the cameras 1102. The illumination source 1104 (e.g., infrared LEDs) may be fitted with an optical element to increase the per-area illumination and uniformity on the object.

Figure 15A:
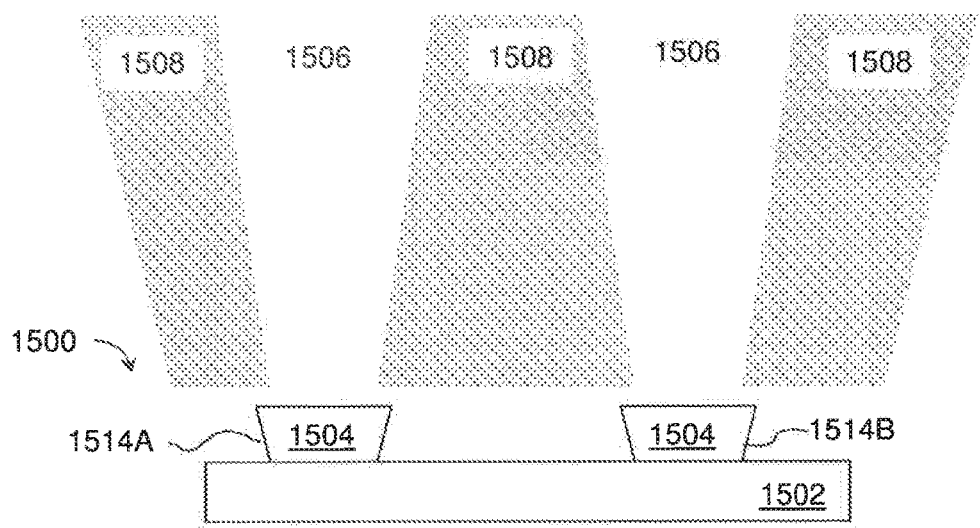
FIGS. 15A-15C are block diagrams of an example split flash array that may be implemented in the apparatuses of FIG. 1 or 11A-11C.
Figure 15B:
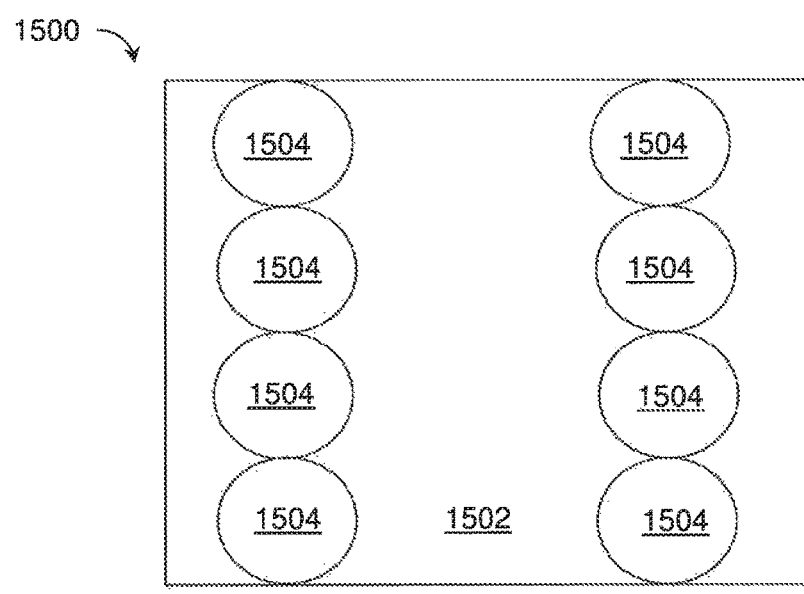
Figure 15C:
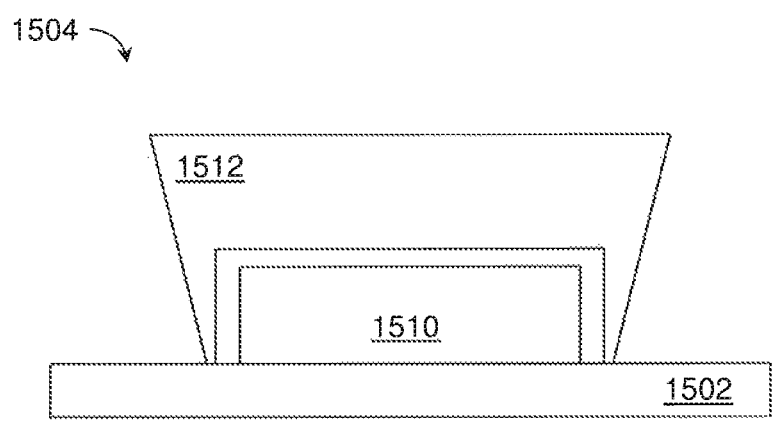

Referring to FIGS. 15A-15C, an alternative example illumination source 1500 is depicted. Specifically, FIGS. 15A-15C illustrate a block diagram of a split flash array 1500 that may be implemented in the apparatus 100 of FIG. 1 and/or the multi-positional apparatus 1100 of FIGS. 11A-11C, for instance. The split flash array 1500 may generally be smaller and weaker than a centralized illumination source, such as the illumination source 1104 of FIGS. 11A-11C. FIG. 15A depicts a top view of the split flash array 1500 and FIG. 15B depicts a top view of the split flash array 1500. FIG. 15C depicts an example of one of the LED assemblies 1504 that may be included in the split flash array 1500. In each of FIGS. 15A-15C, an optical component side 1502 is shown. The optical component side 1502 may be substantially similar and/or correspond to the optical component side 1112 discussed with reference to FIG. 11A.

Generally, the split flash array 1500 may include two or more light arrays 1514A and 1514B (generally, light array or light arrays 1514) including multiple LED assemblies 1504. When operational, each of the light arrays 1514 generate two or more light bands 1506 (FIG. 15A only) between dark areas 1508 (FIG. 15A only). The light bands 1506 may be established by each of the LED assemblies 1504 in each of the light arrays 1514 illuminating simultaneously. For example, a first light array 1514A may illuminate then a second light array 1514B may illuminate. Additionally or alternatively, the first light array 1514A and the second light array 1514B may illuminate at least partially during a common time period. Similarly, if more light arrays are included in the embodiment, they may illuminate simultaneously or sequentially.

With reference to FIG. 15C, the LED assemblies 1504 may include a LED 1510 and an optical element 1512. The optical element 1512 may bend the light in a uniform distribution to the desired shape. For example, the optical element 1512 may bend light emitted by the LED 1510 to a substantially rectangular or a substantially elliptical shape. The optical element 1512 may accordingly generate a light band (1506) having a substantially rectangular cross section. An example optical element 1512 may include a lens configured to collimate the light from the LED 1510.

Referring to FIGS. 11A and 15A-15C, the approximate speed of the object may be estimated as described above. Since the speed of the object is known, it is possible to calculate when the object will pass through the light bands 1506. Thus, the cameras 1102 may be configured to capture images of the object at the times when the object is within the light bands 1506.

Some advantages of split flash array 1500 may include a smaller total illuminated area when compared to the illumination source 1104 of FIG. 11A. The smaller illuminated area may also reduce the number of LED assemblies (e.g., 1504) used in a system and consequently the cost and size of the multi-positional apparatus 1100 or another apparatus implementing the split flash array 1500.

Referring back to FIGS. 11A-11C, a top surface 1114 and a bottom surface 1130 of the multi-positional apparatus 1100 are depicted in FIGS. 11B and 11C, respectively. The top surface 1114 and the bottom surface 1130 are arbitrarily designated as "top" and "bottom" as when measuring the launch parameters of a left-handed player (e.g., as shown in FIG. 12A), the top surface 1114 may be above the bottom surface 1130 and when measuring the launch parameters of a right-handed player (e.g., as shown in FIG. 12B), the bottom surface 1130 may be above the top surface 1114. Each of the top surface 1114 and the bottom surface 1130 may include down-range indicators 1116 and 1128, stand mounts 1118 and 1122, and object placement guides 1120 and 1124.

The down-range indicators 1116 and 1128 point in the down-range direction which may relate to the direction in which the object is generally going to fly. For example, down-range may indicate a horizontal direction of the object. The stand mounts 1118 and 1122 may be configured to accept and/or electrically connect with a stand. An example stand is discussed with reference to FIGS. 13A-13C. The object placement guides 1120 and 1124 may be configured to convey to a user where the object should be initially placed. Additionally or alternatively, the object placement guides 1120 and 1124 may be configured to assist in leveling the multi-positional apparatus 1100 with respect to a stand during the initial set up of the multi-positional apparatus 1100.

The multi-positional apparatus 1100 may also include an auxiliary camera 1110. The auxiliary camera 1110 may be configured to assess a stationary or initial position of an object relative to an acceptable object hitting area. With combined reference to FIGS. 11A, 12A, and 12B, the acceptable object hitting area 1204 may provide a designated starting position for an object 1208. Specifically, FIG. 12A depicts a top view of the multi-positional apparatus 1100 in a left-handed operating environment 1200A for a left-handed user 1202. FIG. 12B depicts a top view of the multi-positional apparatus 1100 in a right-handed operating environment 1200B for a right-handed user 1202. The acceptable object hitting area 1204 may be based on field of view of cameras 1102, the total light available from the illumination source 1104, the positions of the TOSA(s) 1108, and the like.

After assessing a position of the object 1208 relative to the acceptable object hitting area 1204, the auxiliary camera 1110 may provide feedback using the object placement guide 1120 or 1124. For example, the object placement guide 1120 or 1124 may include a reference laser pointer, a line, or another suitable placement guide. The object placement guides 1120 and 1124 may assist user 1202 to place the object 1208 in the acceptable object hitting area 1204. For example, if the object 1208 needs to be moved to the left such that the object 1208 is in the acceptable object hitting area 1204, an LED in the shape of a left arrow included in the object placement guides 1120 and 1124 may blink to signal to the user 1202 to move the object 1208 to the left.

Additionally or alternatively, the multi-positional apparatus 1100 may include a guidance laser 1206. The guidance laser 1206 may indicate to the user 1202 the proper placement of the object 1208. The guidance laser 1206 may be emitted from any suitable optical source mounted to or incorporated in the multi-positional apparatus 1100.

Additionally or alternatively, in some embodiments, a feedback algorithm may be implemented in the multi-positional apparatus 1100. The feedback algorithm may be configured to provide feedback regarding object placement with respect to the acceptable object hitting area 1204. For example, the feedback algorithm may be included in the multi-positional apparatus 1100 without the guidance laser 1206 and/or the auxiliary camera 1110. The feedback algorithm may use a radius of the object from various images captured from the cameras 1102 and may check the radius against a lookup table. By utilizing the measured launch angle and horizontal angle, the feedback algorithm can interpolate the starting position of the object. Once the analysis is complete, the feedback algorithm may provide feedback to the user regarding the position of the object 1208 after the fact, such that user can take action to position the object 1208 within the acceptable object hitting area 1204 in later uses.

Figure 13A:
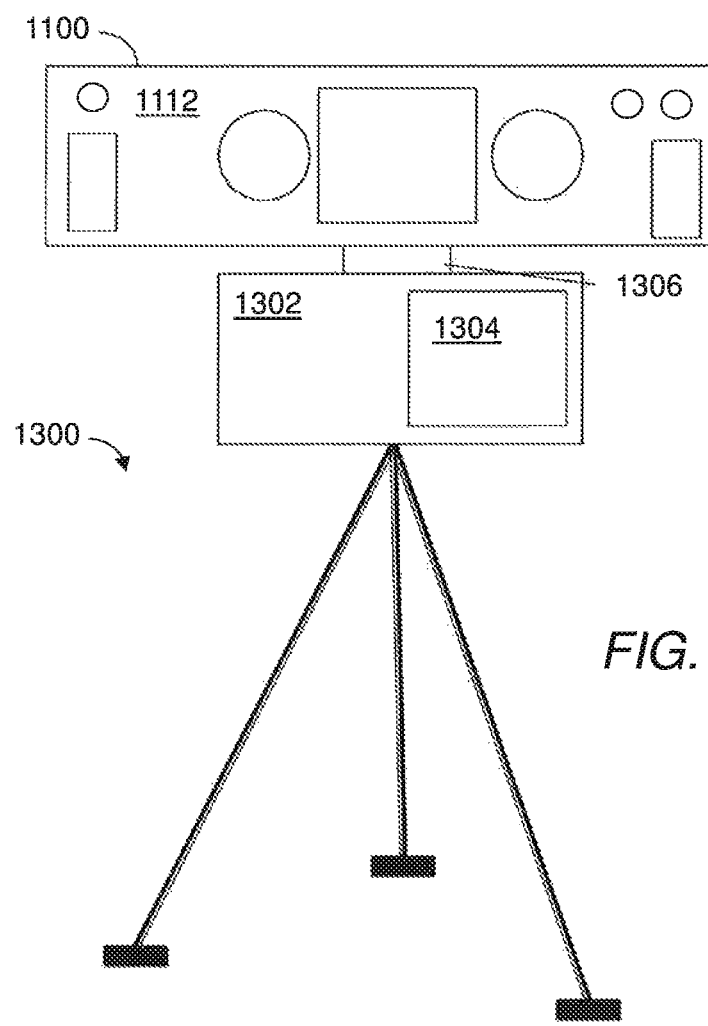
FIGS. 13A-13C are block diagrams of an example stand that may be implemented in the apparatuses of FIG. 1 or 11A-11C.
Figure 13B:
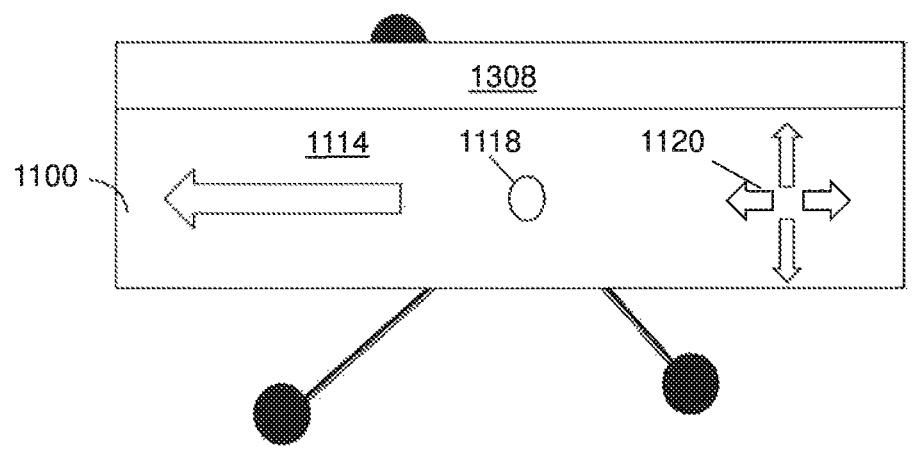
Figure 13C:
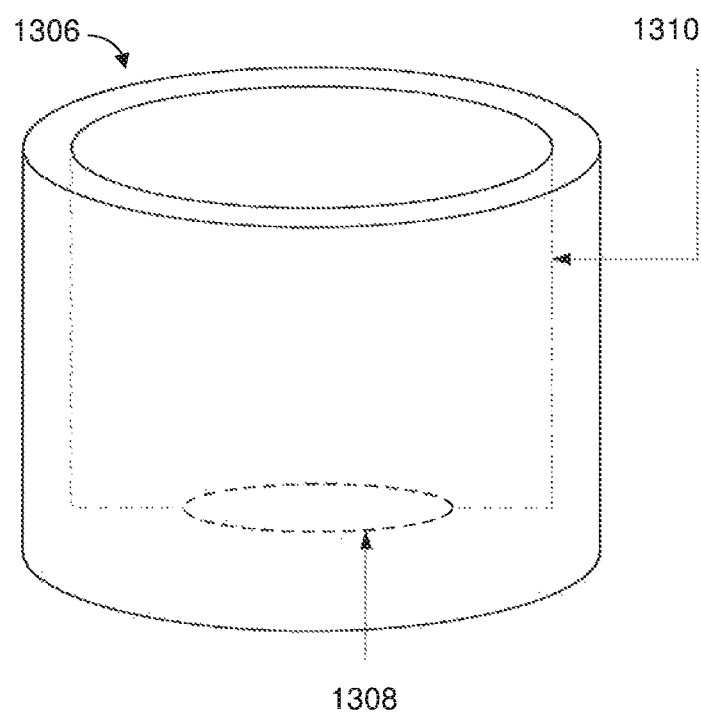

FIGS. 13A-13C are block diagrams of an example stand 1300 that may be implemented in the apparatuses of FIG. 1 or 11A-11C. Generally, the stand 1300 may be configured to attach or be coupled to the stand mounts 1118 and 1122 of FIGS. 11B and 11C. The stand 1300 may enable the multi-positional apparatus 1100 to be used on an uneven surface. Generally, uneven surfaces may introduce inaccuracies of launch parameter measurements. The stand 1300 may be configured to level the multi-positional apparatus 1100 to reduce or eliminate the inaccuracies introduced by the uneven surfaces.

The stand 1300 may include a mechanical alignment system (alignment system) 1304 that may be included in a housing 1302. The user may level the multi-positional apparatus 1100 on uneven surfaces using the alignment system 1304. As used herein, leveling may include the multi-positional apparatus 1100 having substantially zero tilt and substantially zero roll with respect to the earth's gravitational axis.

In some embodiments, the object placement guide 1120 (or 1124) may be used with the stand 1300. For example, LEDs in the object placement guide 1120 may be repurposed to indicate the correct leveling. For example, if the multi-positional apparatus 1100 needs to be tilted towards the front for optimum leveling, the LED included in the object placement guide 1120 may blink, which may indicate the multi-positional apparatus 1100 needs to be tilted towards the front.

Additionally, the stand 1300 may be motorized. In these and other embodiments, the stand 1300 may include one or more microcontrollers, one or more motors, one or more control circuits, and one or more accelerometers for leveling the multi-positional apparatus 1100. The multi-positional apparatus 1100 may be auto-leveled or manually leveled according to adjustments measured by the one or more accelerometers.

In some embodiments in which the stand 1300 is motorized, the housing 1302 of the stand 1300 may include a stand mount point 1306 that corresponds to the stand mounts 1118 or 1122. The stand mounts 1118 or 1122 may include a voltage supply and ground. Similarly, the stand mount point 1306 may include a power point 1308 and a ground surface 1310. The power point 1308 and the ground surface 1310 may be separated by an insulator. When the stand 1300 is coupled to the multi-positional apparatus 1100, the multi-positional apparatus 1100 may provide power to the stand 1300. The stand 1300 may use the power to level the multi-positional apparatus 1100. A benefit of the common power source may include an omission of an additional battery for the stand 1300.

With reference to FIG. 13B, in some embodiments, the multi-positional apparatus 1100 may include a stand housing 1308. The stand housing 1308 may be positioned on a back surface opposite the optical component side 1112 (FIG. 13A). The stand housing 1308 may be configured to store the stand 1300. Additionally, the stand housing 1308 may be configured such that a combination of the multi-positional apparatus 1100 including the stand housing 1308 may be conveniently sized. For example, the multi-positional apparatus 1100 including the stand housing 1308 may be sized to fit into a golf bag.

In the depicted embodiment, the stand 1300 may include a tripod. However, the stand 1300 is not limited to a tripod. In some alternative embodiments, the stand 1300 may include one or more other configurations such as a monopod, a stand with four legs, or any other suitable stand.

Figure 14:
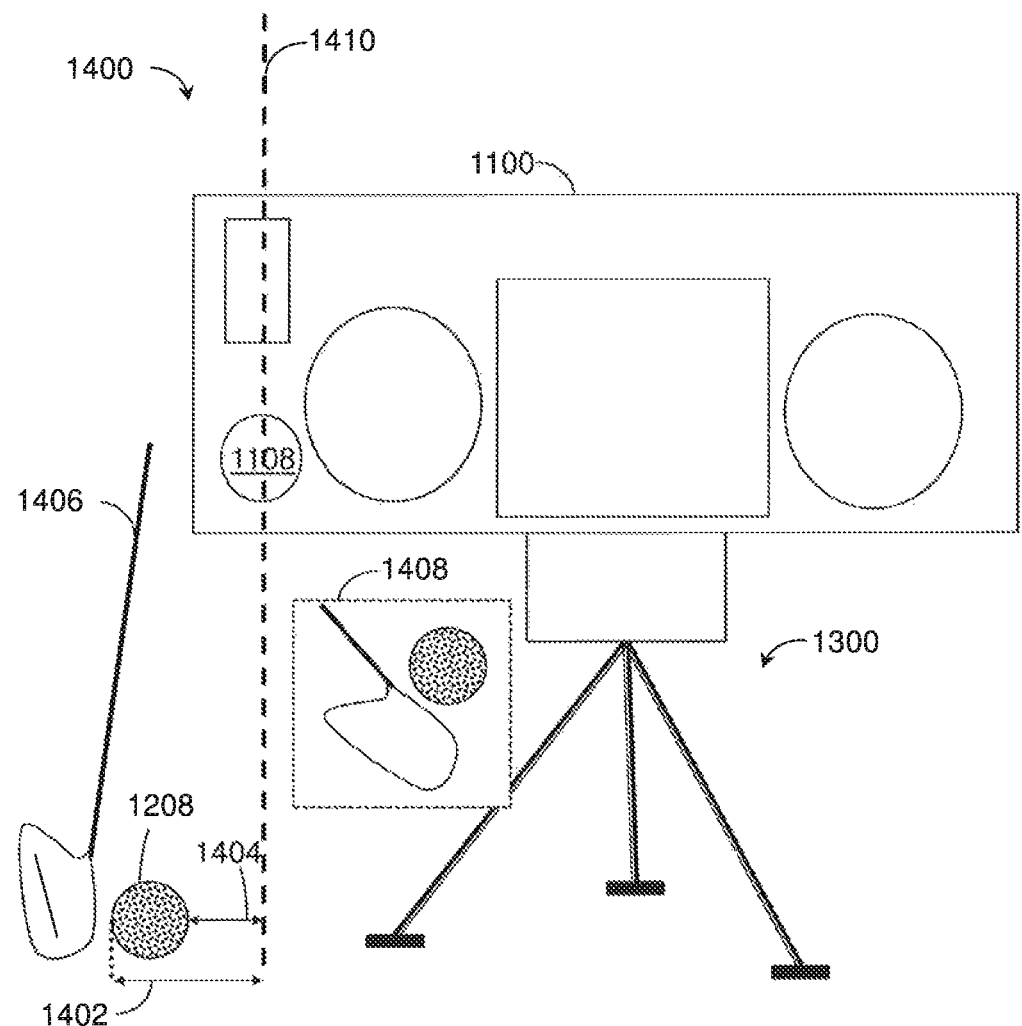
FIG. 14 is a block diagram illustrating an example method of measuring a speed of an initiation object.

FIG. 14 is a block diagram 1400 illustrating an example process of measuring a speed of an initiation object 1406. In FIG. 14, the initiation object 1406 is a golf club. However, in some alternative implementations, the initiation object 1406 may include a pitcher's arm, a baseball bat, etc. FIG. 14 depicts the multi-positional apparatus 1100 measuring a speed of an initiation object 1406. However, any of the apparatuses (e.g., 100, 200, etc.) described herein may be configured to measure a speed of an initiation object 1406.

The multi-positional apparatus 1100 may continue to operate following a valid object trigger event to detect the initiation object 1406 passing through a laser sheet 1410 emitted by the TOSA 1108. The multi-positional apparatus 1100 may measure the time difference between the valid trigger event and valid initiation object 1406 passing through the laser sheet 1410. Subsequently, the multi-positional apparatus 1100 can estimate the speed of the initiation object 1406. The calculation of the speed may depend upon the estimated starting position of the object 1208, the measured speed of the object 1208, and the time of the initiation object 1406, for example.

Specifically, the position of object 1208 may be known prior to a valid trigger event as a result of measurements 1402 and 1404. The position of the initiation object 1406 may also be known at the moment of impact because the diameter of the object 1208 is known (e.g., a difference between measurements 1402 and 1404). Since the object 1208 speed on the horizontal axis is known, the time of contact between the initiation object 1406 and the object 1208 can be calculated from the interpolated position of the object 1208. Once the laser pattern detects the initiation object 1406, the approximate speed of the initiation object 1406 after the contact can be calculated. Additionally, the speed of the initiation object 1406 before the contact can be estimated based on conversion of energy, prior experiments, a lookup table, or some combination thereof, speed of object 1208 and initiation object 1406.

Furthermore, the multi-positional apparatus 1100 may capture an additional image 1408 after initiation object 1406 passes through the laser sheet. The image 1408 may be analyzed and used to determine the type of initiation object 1406 and some of the initiation object 1406 parameters such as loft, approximate head size, etc. The information about the initiation object 1406 may be utilized in a lookup table. The lookup table may be used during future use of the multi-positional apparatus 1100 such that user does not need to enter the information.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for monitoring launch parameters of an object, the apparatus comprising:
    a housing;
    a transmitter optical subassembly (TOSA) disposed within the housing and including at least one laser source configured to transmit a laser sheet along an expected flight path of an object;
    a receiver optical subassembly (ROSA) disposed within the housing and configured to receive light reflected from the object;
    a processing unit configured to estimate a velocity of the object based at least partially on the light reflected back from the object and received at the ROSA;
    a camera configured to capture one or more images of the object at a time in which the object passes through a field of view of the camera according to the estimated velocity of the object; and
    an illumination source configured to emit light at a time in which the object passes through a field of view of a camera according to the estimated velocity of the object;
    wherein the camera, the TOSA, the ROSA, and the illumination source are arranged according to a center line such that the apparatus is configured to operate in a first position, for a right handed golfer and a second position, for a left handed golfer, the second position being a 180° rotation from the first position;
    wherein the TOSA and the ROSA are configured to trigger the camera and an illumination source in the first position and in the second position.

2. The apparatus of claim 1, further comprising a second TOSA and a second ROSA positioned opposite the TOSA and the ROSA, the second TOSA and the second ROSA configured as a triggering TOSA/ROSA pair when the apparatus is in the first position and as a verification TOSA/ROSA pair when the apparatus is in the second position.

3. The apparatus of claim 2, wherein:
    the object includes a golf ball;
    the first position enables the apparatus to measure launch parameters of a left-handed user; and
    the second position enables the apparatus to measure launch parameters of a right-handed user.

4. The apparatus of claim 1, wherein the illumination source includes a split flash array.

5. The apparatus of claim 4, wherein the split flash array includes two light arrays configured to emit two light bands according to the estimated velocity of the object.

6. The apparatus of claim 1, further comprising an auxiliary camera configured to assess an initial position of the object relative to an acceptable object hitting area.

7. The apparatus of claim 6, wherein the auxiliary camera is further configured to provide feedback to a user via an object placement guide.

8. A system for monitoring launch parameters, comprising:
    an apparatus including:
        a housing;
        a transmitter optical subassembly (TOSA) disposed within the housing and configured to transmit a laser sheet,
        a receiver optical subassembly (ROSA) disposed within the housing and configured to receive light reflected from an object,
        a processing unit configured to estimate a velocity of the object based at least partially on light reflected back from the object and received at the ROSA,
        an illumination source configured to emit light at a time in which the object passes through a field of view of a camera according to the estimated velocity of the object, the camera configured to capture one or more images of the object at a time in which the object passes through a field of view of the camera according to the estimated velocity of the object,
        a second TOSA and a second ROSA positioned opposite the TOSA and the ROSA, the second TOSA and the second ROSA configured as a triggering TOSA/ROSA pair when the apparatus is in the first position and as a verification a TOSA/ROSA pair when the apparatus is in the second position, and
        a stand mount;
    a mobile device configured to process the images; and
    a motorized stand configured to be coupled to the apparatus and to receive power from the apparatus via the stand mount.

9. The system of claim 8, wherein the motorized stand is configured to be auto-leveled.

10. The system of claim 8, wherein:
    the apparatus further includes a second stand mount, the stand mount being included on a top surface of the apparatus and the second stand mount being included on a bottom surface of the apparatus;
    the illumination source and the camera arranged according to a center line; and
    the apparatus is configured to measure launch parameters in a first position, for a right handed golfer and a second position, for a left handed golfer, the second position being a 180° rotation from the first position.

11. The system of claim 10, wherein:
    in the first position the motorized stand is coupled to the apparatus via the stand mount; and
    in the second position the motorized stand is coupled to the apparatus via the second stand mount.

12. The system of claim 8, wherein the TOSA and the ROSA are configured to trigger the camera and the illumination source when the apparatus is in the first position and in the second position.

13. The system of claim 8, further comprising an auxiliary camera configured to assess an initial position of the object relative to an acceptable object hitting area and to provide feedback to a user via an object placement guide.

14. The system of claim 13, wherein the illumination source includes a split flash array having two light arrays configured to emit two light bands.

15. The system of claim 14, wherein:
    the object includes a golf ball;
    the first position enables the apparatus to measure launch parameters of a left-handed user;
    the second position enables the apparatus to measure launch parameters of a right-handed user; and
    the apparatus is configured to measure the speed of the golf club that contacts the golf ball.

16. The system of claim 8, further comprising a stand housing configured to store the motorized stand.

17. An apparatus for monitoring launch parameters of an object, the apparatus comprising:
    a housing;
    a transmitter optical subassembly (TOSA) disposed within the housing and including at least one laser source configured to transmit a laser sheet along an expected flight path of an object;

a receiver optical subassembly (ROSA) disposed within the housing and configured to receive light reflected from the object;

a processing unit configured to estimate a velocity of the object based at least partially on the light reflected back from the object and received at the ROSA;

a camera configured to capture one or more images of the object at a time in which the object passes through a field of view of the camera according to the estimated velocity of the object; and an illumination source configured to emit light at a time in which the object passes through a field of view of a camera according to the estimated velocity of the object;

wherein the camera, the TOSA, the ROSA, and the illumination source are arranged according to a center line such that the apparatus is configured to operate in a first position, for a right handed golfer and a second position, for a left handed golfer, the second position being a 180° rotation from the first position.

* * * * *